(12) United States Patent   (10) Patent No.: US 12,287,859 B2
Yoo et al.   (45) Date of Patent: Apr. 29, 2025

(54) BIOMETRIC LIVENESS AUTHENTICATION METHOD AND ELECTRONIC DEVICE

(71) Applicant: Samsung Electronics Co., Ltd., Gyeonggi-do (KR)

(72) Inventors: Juwoan Yoo, Gyeonggi-do (KR); Wonsuk Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 17/720,565

(22) Filed: Apr. 14, 2022

(65) Prior Publication Data

US 2022/0405365 A1    Dec. 22, 2022

Related U.S. Application Data

(63) Continuation of application No. PCT/KR2022/004854, filed on Apr. 5, 2022.

(30) Foreign Application Priority Data

Jun. 18, 2021 (KR) .......................... 10-2021-0079335

(51) Int. Cl.
   *G06F 21/00* (2013.01)
   *G06F 21/32* (2013.01)
   (Continued)

(52) U.S. Cl.
   CPC ............ *G06F 21/32* (2013.01); *G06V 10/141* (2022.01); *G06V 40/172* (2022.01); *G06V 40/18* (2022.01); *G06V 40/40* (2022.01)

(58) Field of Classification Search
   CPC . G06F 21/32; G06F 1/16; G06F 21/44; G06F 21/45; G06F 1/1605; G06F 1/1686;
   (Continued)

(56) References Cited

U.S. PATENT DOCUMENTS 6,760,467 B1    7/2004  Min et al.
8,411,909 B1    4/2013  Zhao et al.
(Continued)

FOREIGN PATENT DOCUMENTS

EP        3724815         10/2020
KR    20070120879 A1     5/2007
(Continued)

OTHER PUBLICATIONS

Translation of KR102210062381A (Year: 2021).*
(Continued)

*Primary Examiner* — Kendall Dolly
(74) *Attorney, Agent, or Firm* — Cha & Reiter, LLC

(57) ABSTRACT

Certain embodiments of the disclosure disclose a method and a device, the device including a display, a camera module disposed under the display, at least one light source disposed to correspond to the camera module, a memory, and a processor operatively connected to the display, the camera module, the light source, and/or the memory. The processor may be configured to drive the camera module and the at least one light source in response to a request for biometric authentication, acquire a face image from the camera module, analyze the face image produced at least in part by light emitted from the driven at least one light source, and perform the biometric authentication based on the analysis result. Other embodiments are possible.

16 Claims, 15 Drawing Sheets

(51) Int. Cl.
*G06V 10/141* (2022.01)
*G06V 40/16* (2022.01)
*G06V 40/18* (2022.01)
*G06V 40/40* (2022.01)

(58) Field of Classification Search
CPC .... G06V 10/141; G06V 40/172; G06V 40/18; G06V 40/40; G06V 40/16
See application file for complete search history.

(56) References Cited

U.S. PATENT DOCUMENTS

| | | | |
|---|---|---|---|
| 9,672,341 B2 | 6/2017 | Danikhno et al. | |
| 10,380,418 B2* | 8/2019 | Agrawal | G06V 40/19 |
| 10,762,367 B2 | 9/2020 | Ackerman et al. | |
| 11,080,516 B1* | 8/2021 | Joshi | G06V 40/19 |
| 11,200,436 B2 | 12/2021 | Ebihara | |
| 2002/0010307 A1 | 1/2002 | Schwab | |
| 2007/0120879 A1 | 5/2007 | Kanade et al. | |
| 2009/0016574 A1 | 1/2009 | Tsukahara | |
| 2011/0211056 A1 | 9/2011 | Publicover et al. | |
| 2014/0169642 A1 | 6/2014 | Law et al. | |
| 2016/0019420 A1 | 1/2016 | Feng et al. | |
| 2016/0117544 A1 | 4/2016 | Hoyos et al. | |
| 2017/0061210 A1* | 3/2017 | Ollila | G06V 40/193 |
| 2018/0034812 A1 | 2/2018 | Rahman | |
| 2019/0205680 A1* | 7/2019 | Miu | G06V 40/45 |
| 2020/0226237 A1 | 7/2020 | He et al. | |
| 2021/0158509 A1 | 5/2021 | Kwak et al. | |

FOREIGN PATENT DOCUMENTS

| | | |
|---|---|---|
| KR | 10-2013-0058665 A | 6/2013 |
| KR | 10-2019-0130435 A | 11/2019 |
| KR | 10-2021-0062381 A | 5/2021 |

OTHER PUBLICATIONS

Translation of Kr 1020130058665A (Year: 2013).*
International Search Report dated Jun. 28, 2022.
Extended European Search Report dated Sep. 26, 2024.

* cited by examiner

BIOMETRIC LIVENESS AUTHENTICATION METHOD AND ELECTRONIC DEVICE

CROSS-REFERENCE TO RELATED APPLICATION(S)

This application is a Continuation of and claims priority under 35 U.S.C. § 120 to PCT International Application No. PCT/KR2022/004854, which was filed on Apr. 5, 2022, and claims priority to Korean Patent Application No. 10-2021-0079335, filed on Jun. 18, 2021, in the Korean Intellectual Property Office, the disclosure of which are incorporated by reference herein their entirety.

BACKGROUND

Technical Field

One or more embodiments of the disclosure generally relate to a biometric liveness authentication method and an electronic device executing the same.

Description of Related Art

As digital technologies have developed, there has been widespread use of various types of electronic devices such as mobile communication terminals, personal digital assistants (PDAs), electronic wallets, smartphones, tablet personal computers (tablet PCs), and wearable devices. in order to support and enhance functions of such electronic devices, the hardware and/or software of the electronic devices have been continuously improved.

With respect to biometric authentication technologies, liveness detection technology may refer to the technology used for recognizing whether an image acquired from a camera is of an actual person as opposed to a counterfeit (for example, a photograph of the person or another person wearing a 3D mask). An electronic device may acquire a face image (or face data) from a camera disposed on the front surface of the electronic device, may analyze the acquired face image, and may determine whether the same corresponds to the actual user's face (for example, live) or a fake (for example, not live) through liveness authentication.

SUMMARY

An electronic device according to an embodiment of the disclosure may include a display, a camera module disposed under the display, at least one light source disposed to correspond to the camera module, a memory, and a processor operatively connected to the display, the camera module, the light source, and/or the memory, wherein the processor is configured to drive the camera module and the at least one light source in response to a request for biometric authentication, acquire a face image from the camera module, analyze the face image produced at least in part by light emitted from the driven at least one light source, and perform the biometric authentication based on the analysis result.

A method for operating an electronic device according to an embodiment of the disclosure may include driving a camera module, disposed under a display of the electronic device, and at least one light source, disposed to correspond to the camera module, in response to a request for biometric authentication, acquiring a face image from the camera module, analyzing the face image produced at least in part by light emitted from the driven at least one light source, and performing the biometric authentication based on the analysis result.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Certain embodiments disclosed herein may provide a method and a device for authenticating biometric liveness by disposing a camera below a display included in the electronic device (for example, under display camera (UDC)), disposing at least one light source at a designated distance from the camera, and randomly driving the light source.

According to certain embodiments, one or more light sources in multiple light sources may be randomly driven, and based on whether reflected light corresponding to the number of driven light sources is detected from the face image acquired from a camera, biometric liveness may be determined.

According to certain embodiments, a camera and one or more light sources may be disposed below a display without making a hole in the display, and different light sources may be made to emit light randomly to output diverse light patterns, thereby enhancing security.

According to certain embodiments, an infrared ray (IR) LED invisible to the user's eyes may be used as a light source such that security can be enhanced, because the user who has requested biometric authentication is not aware of the driven light source.

According to certain embodiments, an IR filter may be utilized to selectively sense only information in a designated wavelength so as to reduce the influence of an operating display on the images acquired by a camera, thereby enabling biometric liveness detection even when the display is used.

According to certain embodiments, biometric liveness detection is possible regardless of peripheral light (low illumination or outdoor environment), and the intensity of the light source may be adjusted such that biometric liveness detection is possible regardless of the display transmittance.

Figure 1:
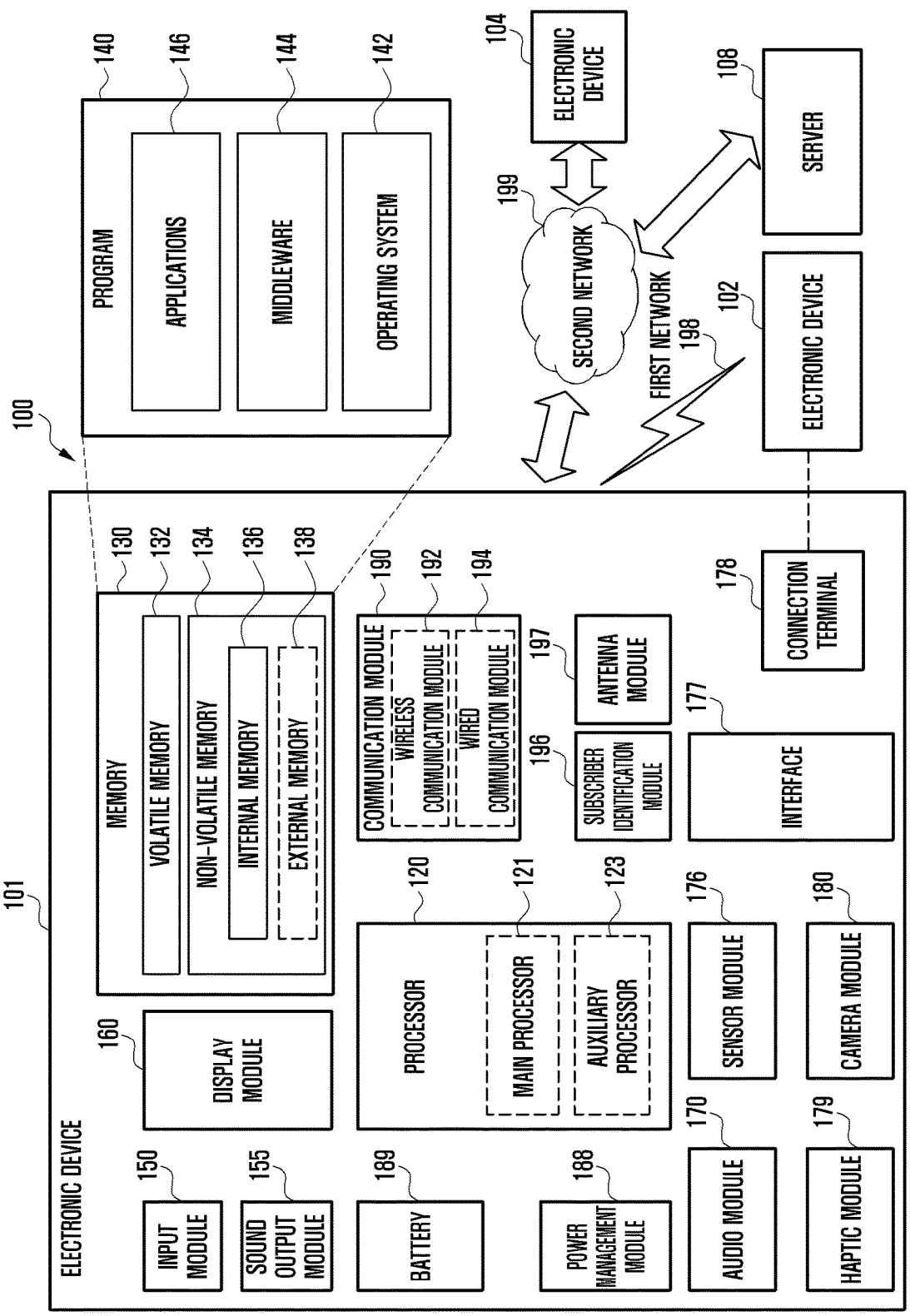
FIG. 1 is a block diagram of an electronic device in a network environment according to an embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2A:
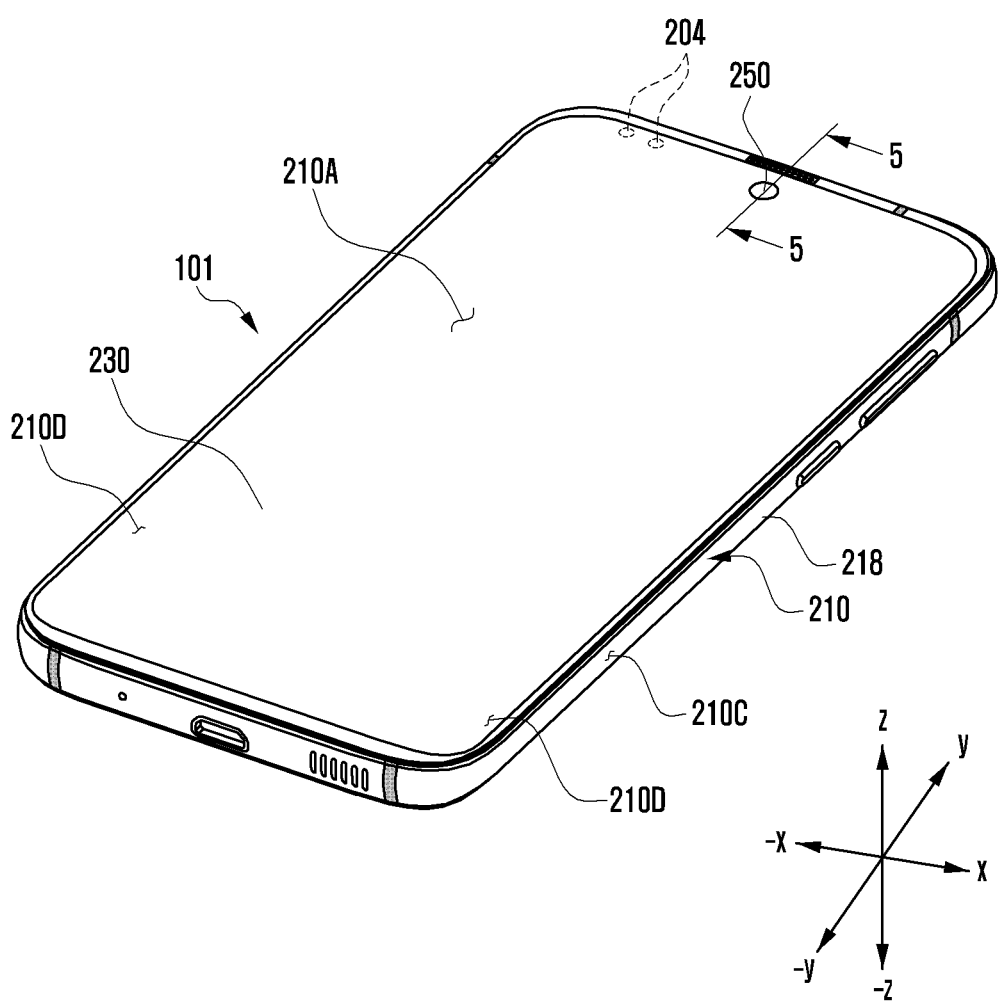
FIGS. 2A and 2B are perspective views of an electronic device according to an embodiment.
Figure 2B:
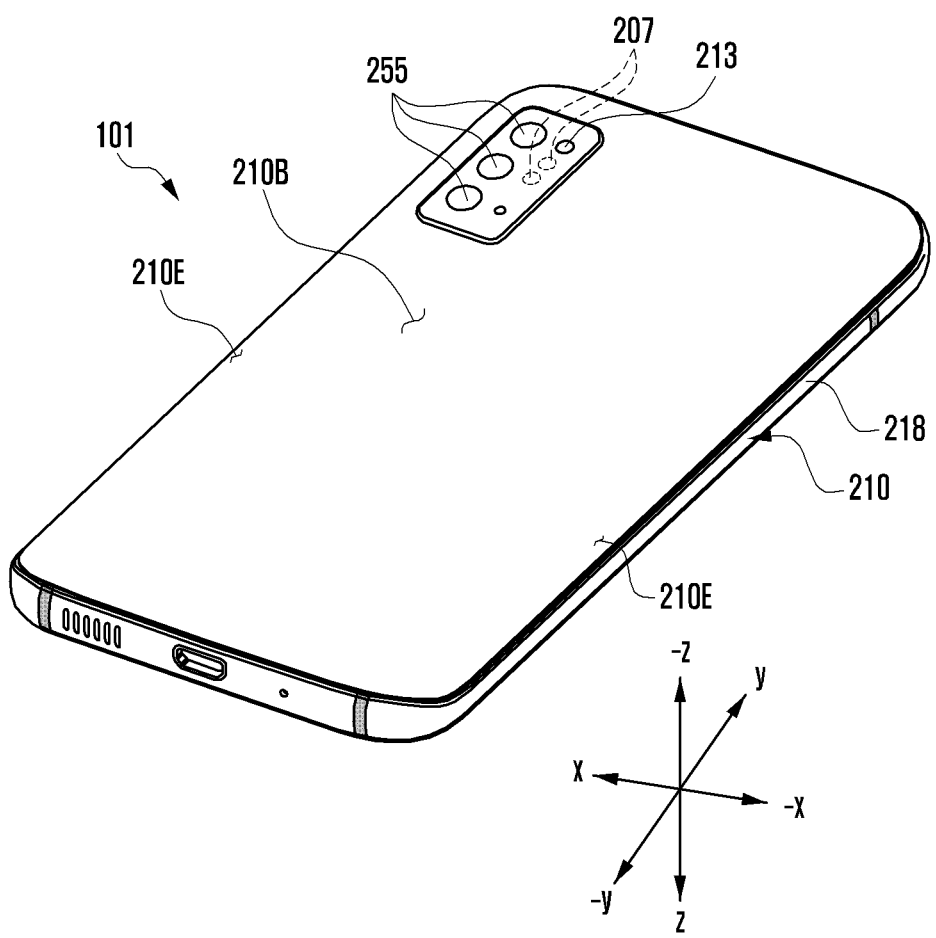

FIGS. 2A and 2B are perspective views of an electronic device according to an embodiment. FIG. 2A is a perspective view of the front surface of the electronic device 101 in FIG. 1 according to an embodiment, and FIG. 2B is a perspective view of the rear surface of the electronic device 101 in FIG. 1.

Referring to FIGS. 2A and 2B, an electronic device (e.g., the electronic device 101 in FIG. 1) according to an embodiment may include a housing 210 which includes a first surface (or a front surface) 210A, a second surface (or a rear surface) 210B, and a side surface 210C surrounding the space between the first surface 210A and the second surface 210B. According to another embodiment, the housing 210 may be a structure that incorporates at least some of the first surface 210A, the second surface 210B, and the side surface 210C. According to an embodiment, the first surface 210A may be formed by a front plate, at least a part of which is substantially transparent (e.g., it may be a polymer plate, or a glass plate including various coated layers). The second surface 210B may be formed by a substantially opaque rear plate. The rear plate may be made of, for example, coated or colored glass, ceramic, polymer, metal (e.g., aluminum, stainless steel (STS), or magnesium), or a combination of at least two of the materials. The side surface 210C may be coupled to the front plate and the rear plate, and may be formed by a side bezel structure 218 (or "a side member") containing metal and/or polymer. In an embodiment, the rear plate and the side bezel structure 218 may be integrated, and may contain the same material (e.g., a metal material such as aluminum).

According to an embodiment, the front plate may include a first area 210D, curved and seamlessly extending from the first surface 210A toward the rear plate, at both ends of the longitudinal edges of the front plate. Alternatively, the rear plate may include a second area 210E, curved and seamlessly extending from the second surface 210B toward the front plate, at both ends of the longitudinal edges thereof. In an embodiment, the front plate or the rear plate may include only one of the first area 210D or the second area 210E. In an embodiment, the front plate may include only a flat surface disposed parallel to the second surface 210B without including the first area 210D and the second area 210E. When the electronic device 101 is seen from the side, the side bezel structure 218 may have a first thickness (or width) at the side surface which does not include the first area 210D or the second area 210E, described above, and may have a second thickness less than the first thickness at the side surface which includes the first area 210D or the second area 210E.

A display 230 (e.g., the display module 160 in FIG. 1) may be exposed through the majority part of the front plate. In an embodiment, at least a part of the display 230 may be exposed through the front plate which includes the first surface 210A and the first area 210D. The display 230 may be coupled to or disposed adjacent to a touch sensing circuit, a pressure sensor capable of measuring the strength (pressure) of touches, and/or a digitizer for detecting a magnetic field-type stylus pen. In an embodiment, at least some of sensor modules 204 and 207 (e.g., the sensor module 176 in FIG. 1) and/or at least some of input modules (e.g., the input module 150 in FIG. 1) may be disposed in the first area 210D and/or the second area 210E.

The sensor modules 204 and 207 may generate electrical signals or data values corresponding to operation states inside the electronic device 101 or environment states outside the electronic device 101. The sensor modules 204 and 207 may include, for example, a first sensor module (e.g., proximity sensor) and/or a second sensor module (e.g., fingerprint sensor), disposed in the first surface 210A of the housing 210, and/or a third sensor module (e.g., heart-rate monitor (HRM) sensor) disposed in the second surface 210B of the housing 210. The fingerprint sensor may be disposed in a partial area of the first surface 210A (e.g., implementing a home key button) of the housing 210 or a partial area of the second surface 210B, and/or under the display 230.

Camera modules 250 and 255 (e.g., the camera module 180 in FIG. 1) may include a first camera module 250 disposed in the first surface 210A of the electronic device 101, a second camera module 255 disposed in the second surface 210B, and/or a flash 213. The camera modules 250 and 255 may include one lens or multiple lenses, an image sensor, and/or an image signal processor. The flash 213 may include a light-emitting diode or a xenon lamp. In an embodiment, at least two lenses (wide-angle lens, ultra-wide-angle lens, or telephoto lens) and image sensors may be disposed in one surface of the electronic device 101.

The first camera module 250, some sensor modules 204, and/or an indicator may be disposed to be exposed through the display 230. For example, the first camera module 250, the sensor module 204, or the indicator may be disposed in the inner space of the electronic device 101 but may be exposed through an opening of the display 230, an opening of the front plate, or transmissive areas thereof. According to an embodiment, the area in which the display 230 overlaps the first camera module 250 is an active area in which contents are displayed, and may be a transmissive area having predetermined transmissivity. According to an embodiment, the transmissive area may have transmissivity ranging from about 5% to about 20%. This transmissive area may include an area overlapping an effective area (e.g., field-of-view area) of the first camera module 250, through which light that is imaged by an image sensor passes. For example, the transmissive area of the display 230 may include an area having a pixel density lower than that of nearby areas. For example, the transmissive area may be used instead of an opening or inactive area in the display. For example, the first camera module 250 may be an under-display camera (UDC). In another embodiment, some sensor modules 204 may be disposed so as to perform functions without being visually exposed through the front plate in the inner space of the electronic device. For example, in this case, the area of the display 230, which overlaps the sensor module, may not require a bored opening.

According to an embodiment, the electronic device 101 is a bar-type or plate-type device, but the disclosure is not limited thereto. For example, the electronic device 101 may be a foldable electronic device, a slidable electronic device, a stretchable electronic device, and/or a rollable electronic device. The "foldable electronic device", the "slidable electronic device", the "stretchable electronic device", and/or the "rollable electronic device" may refer to devices in which bending deformation of the display 230 is possible, so that at least a part of the electronic device can be folded or wound (or rolled), or the area of the electronic device can be at least partially enlarged and/or received into the housing 210. In the foldable electronic device, the slidable electronic device, the stretchable electronic device, and/or the rollable electronic device, the screen display area may be extended by unfolding a display or exposing the wider area of the display according to the user's needs.

Figure 3:
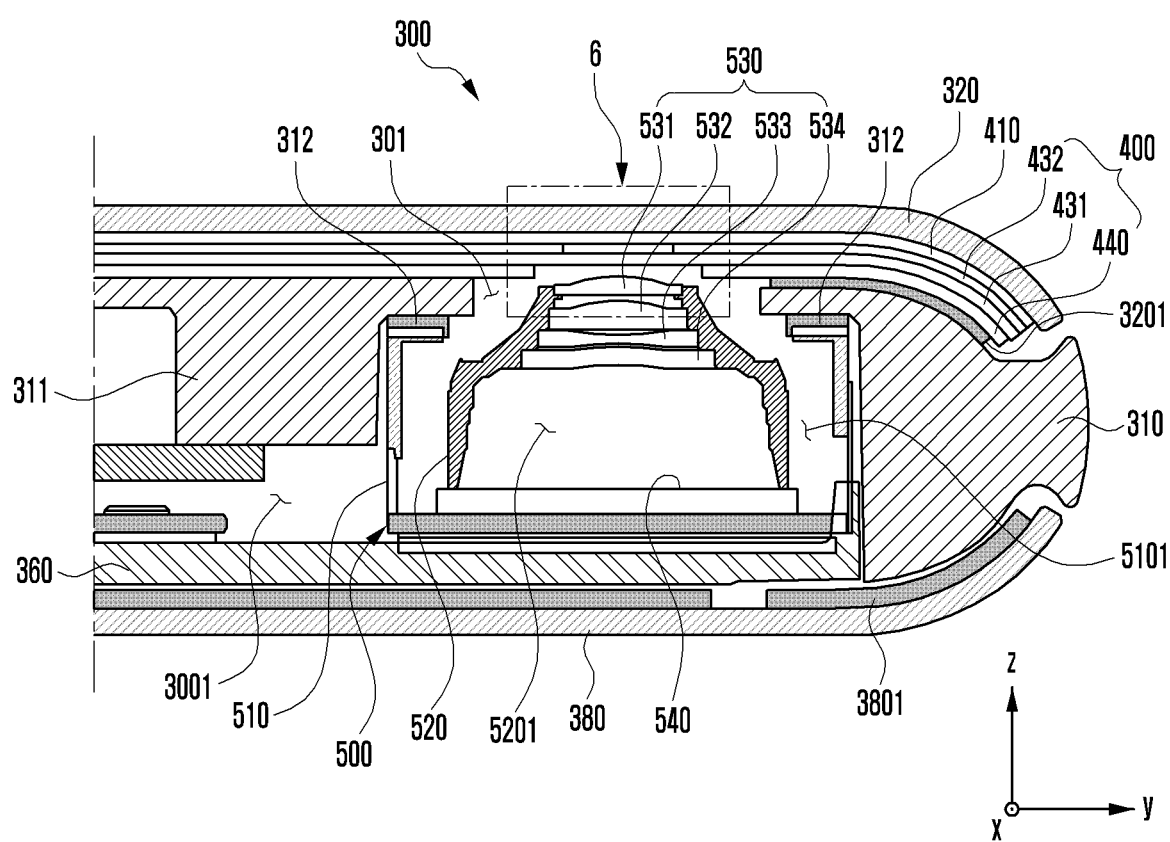
FIG. 3 is a partial cross-sectional view of an electronic device according to an embodiment.

FIG. 3 is a partial cross-sectional view of an electronic device, taken along line 5-5 in FIG. 2A according to an embodiment.

The description of FIG. 3 refers to an unbreakable (UB) type OLED display (e.g., curved display) as an example, but the instant disclosure is not so limited. For example, in other embodiments the display may be a flat on-cell touch Active Matrix Organic Light-Emitting Diode (AMOLED) (OCTA) display.

Referring to FIG. 3, an electronic device 300 may include a front cover 320 (e.g., cover member, front plate, front window, or first plate) facing a first direction (the z-axis direction), a rear cover 380 (e.g., rear cover member, rear plate, rear window, or second plate) facing a direction opposite to the direction faced by the front cover 320, and a side member 310 surrounding a space 3001 between the front cover 320 and the rear cover 380. According to an embodiment, the electronic device 300 may include a first waterproof member 3201 disposed between a subsidiary material layer 440 of the display 400 and the side member 310. According to an embodiment, the electronic device 300 may include a second waterproof member 3801 disposed between the side member 310 and the rear plate 380. The first waterproof member 3201 and the second waterproof member 3801 may prevent outside foreign matter or water from flowing into the inner space 3001 of the electronic device 300. In another embodiment, a waterproof member may be disposed in at least a part of a mounting support structure between a camera module 500 and the side member 310. In another embodiment, the first waterproof member 3201 and/or the second waterproof member 3801 may be replaced with an adhesive member.

According to an embodiment, the side member 310 may further include a first support member 311 which at least partially extends into the inner space 3001 of the electronic device 300. According to an embodiment, the first support member 311 may be initially a separate components that is structurally coupled with the side member 310 during manufacture. According to an embodiment, the first support member 311 may support the camera module 500 such that the camera module 500 is aligned and disposed near the rear surface of the display panel 431 through an opening (OP) (shown in FIG. 4) of the subsidiary material layer 440 of the display 400.

According to an embodiment, the camera module 500 may include a camera housing 510, a lens housing 520 disposed in an inner space 5101 of the camera housing 510 and at least partially protruding in the display direction (e.g., the z-axis direction), multiple lenses 530 (531, 532, 533, and 534) aligned at regular intervals in an inner space 5201 of the lens housing 520, and at least one image sensor 540 disposed in the inner space 5101 of the camera housing 510 so as to acquire at least a part of the light passing through the multiple lenses 530. According to an embodiment, when the camera module 500 includes an auto focus (AF) function, the lens housing 520 may be moved by a particular driver in the camera housing 510 such that the distance to the display panel 431 varies.

According to an embodiment, a separate driver may be disposed such that the camera module 500 changes the position of at least one of the multiple lenses 530 in order to perform the AF function. In another embodiment, in the camera module 500, the camera housing 510 may be omitted, and the lens housing 520 may be directly coupled to the first support member 311 via a predetermined alignment process. According to an embodiment, the lens housing 520 is directly disposed on the first support member 311 in order to reduce a camera arrangement space. In this embodiment, the camera housing 510 may be omitted and the lens housing 520 may be disposed to be attached to one side surface of the first support member 311. According to an embodiment, the camera module 500 may be aligned through a through-hole 301 of the first support member 311, and then may be attached to the rear surface of the first support member 311 by an adhesive member 312 (e.g., bonding member or tape member).

Figure 4:
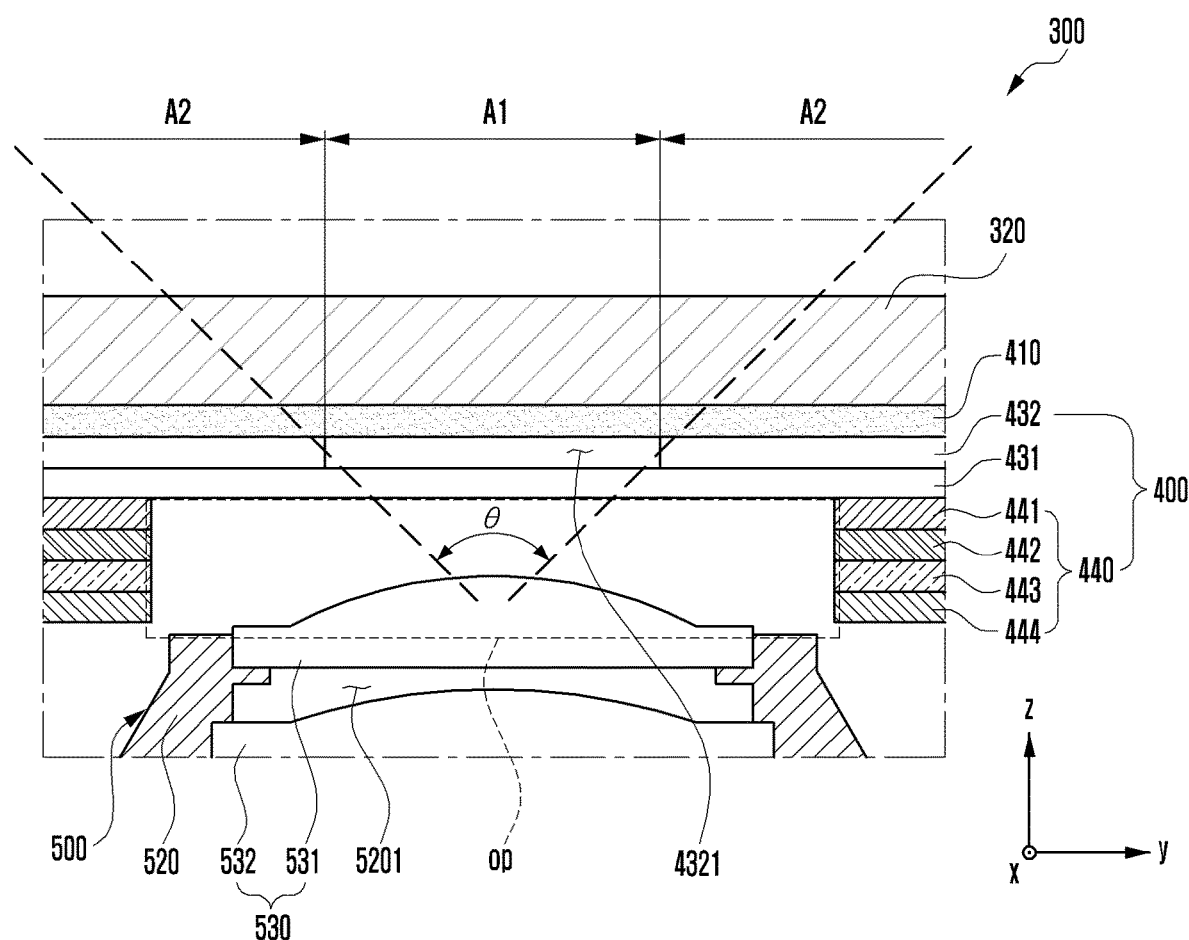
FIG. 4 is an enlarged cross-sectional view of an area including a camera module of an electronic device according to an embodiment.

FIG. 4 is an enlarged cross-sectional view of an area including a camera module of an electronic device according to an embodiment. For example, FIG. 4 is an enlarged view of an area 6 including the camera module in FIG. 3.

Referring to FIG. 4, the electronic device 300 may include an adhesive layer 410, a polarizer (POL) 432, the display panel 431, and the subsidiary material layer 440, which are disposed between the rear surface of the front cover 320 and the side member 310. According to an embodiment, when the front plate 320 is seen from above, the POL 432 may include an opening 4321 formed in order to improve optical transmissivity of the camera module 500. In another embodiment, in the adhesive member (or the adhesive layer) 410 disposed on the POL 432, the part corresponding to the opening 4321 may be at least partially omitted. That is, the adhesive member (or the adhesive layer) 410 may have an opening corresponding to the opening 4321. In an embodiment, the opening 4321 formed in the POL 432 may be filled with an index material for adjusting the refractive index according to an increase in interface reflection.

According to an embodiment, the area of the POL 432 corresponding to the multiple lenses 530 may have high transmissivity without having the opening 4321 formed therethrough. For example, at least a partial area of the POL 432 (e.g., the area corresponding to the multiple lenses 530) may be made of a material having transmissivity different from that of the remaining area of the POL 432, or may be made of another member capable of increasing transmissivity. According to an embodiment, the member (not shown) for increasing transmissivity may be disposed on at least a part (e.g., the upper side surface or the lower side surface) of the area of the POL 432 corresponding to the multiple lenses 530. According to an embodiment, when the front cover 320 is seen from above (e.g., in the z-axis direction), the subsidiary material layer 440 may include an opening (OP) formed in the area at least partially overlapping the multiple lenses 530. According to an embodiment, the opening (OP) formed in the subsidiary material layer 440 may be one opening (OP) formed by overlapping an opening formed in a light-blocking layer 441, an opening formed in a cushion layer 442, an opening formed in a functional member 443, and an opening formed in a conductive member 444. According to an embodiment, the openings in the members 441-444 may have different sizes to correspond to the shape of the camera module 500.

According to an embodiment, when the display 400 is seen from above (e.g., the z-axis direction), the display panel 431 may include a first area A1, which overlaps the field of view (θ) of the camera module 500, and a second area A2 surrounding the first area A1. According to an embodiment, the first area A1 may have light transmissivity that is required by the camera module 500. The appropriate light transmissivity may be obtained through adjustment of the pixel density and/or the wiring density in the first area A1. According to an embodiment, the second area A2 may be a normal active area of the display panel 431. According to an embodiment, the second area A2 may be an area in which light transmissivity for the camera module 500 has not been taken into account. According to an embodiment, the display panel 431 may include first multiple pixels, arranged to have a first arrangement density in the first area A1, and second multiple pixels having a second arrangement density higher than the first arrangement density in the second area A2. In an embodiment, the wiring density of the first area A1 may be lower than the wiring density of the second area A2, thereby contributing to transmissivity improvement.

According to an embodiment, the first area A1 of the display panel 431 has a lower pixel density than the second area A2 surrounding the first area A1, and thus a light-transmitting area in the first area A1 between pixels, which does not emit light, may be recognized as a black area by the user. The display panel 431 according to certain embodiments of the disclosure may include a light extractor for guiding at least a part of light generated through the pixels in the first area A1 so as to be totally reflected to an optical waveguide layer and emitted to the outside, so that the light appears to be emitted from the light-transmitting area, and thus the above problems may be solved.

Figure 5:
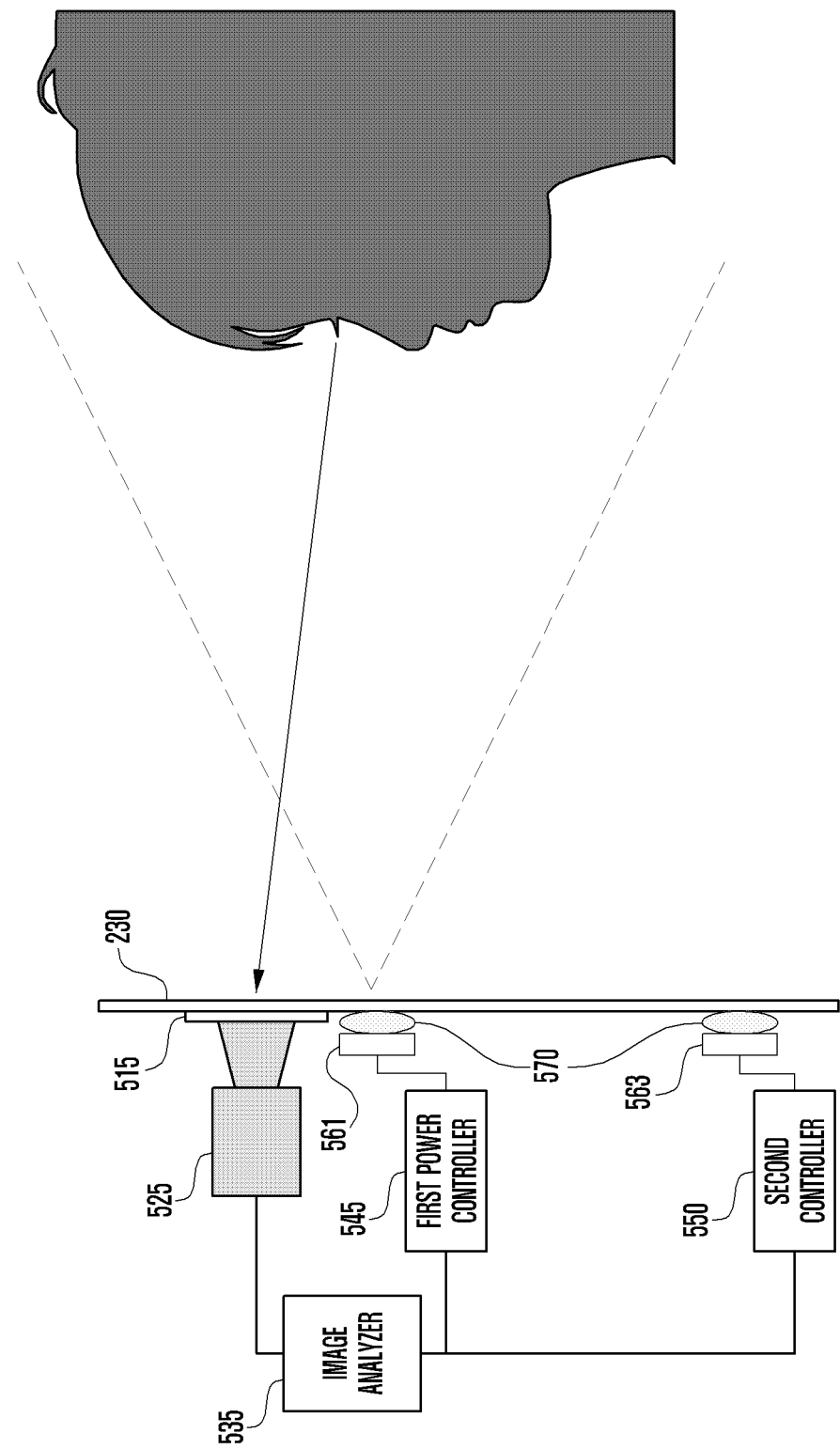
FIG. 5 illustrates an example in which a camera and at least one light source are disposed in an electronic device according to an embodiment.

FIG. 5 illustrates an example in which a camera and at least one light source are disposed in an electronic device according to an embodiment. FIG. 5 illustrates a state where the front surface (e.g., surface on which the display is exposed) of an electronic device visible to the user while the electronic device is in a vertical position.

Referring to FIG. 5, the electronic device (e.g., the electronic device 101 in FIG. 1) according to an embodiment may include a camera 525 (e.g., the camera module 180 in FIG. 1 or the camera modules 250 and 255 in FIGS. 2A and 2B) under the display (e.g., the display module 160 in FIG. 1 or the display 230 in FIGS. 2A and 2B) (e.g., the −z-axis direction in FIG. 2A). The display 230 includes an active area in which information is displayed, and may be implemented as, for example, an OLED. The camera 525 may include a filter 515 (e.g., IR band pass filter), an image sensor, or at least one light source (e.g., a first light source 561 and a second light source 563). The camera 525 may output light through the at least one light source, the output light reflected by an object (e.g., subject, person, or thing) may pass through the filter 515, and light in a designated wavelength band may be captured by the image sensor. When the image sensor is close to the light source, a red-eye effect occurs. When the image sensor is far from the light source, the amount of light may be reduced or light uniformity may be achieved.

The pupil (pupil of an eye) of a person may be reduced in a bright environment to decrease the amount of light received by the retina and may be enlarged in a dark environment to increase the amount of light, thereby automatically adjusting the amount of light reaching the retina depending on brightness and darkness. When an image of the face of a person is captured using a flash in a dark environment, the dark-adapted pupils are initially enlarged, and thus when light from the flash reaches the retina, the light may be reflected by the capillaries behind the retina. At this time, the photographed pupil of the person appears red, not the original black, and this effect may be called a red-eye effect.

The camera 525 may be designed such that the image sensor and the at least one light source are positioned while being spaced a predetermined distance apart from each other. IR LEDs may be used as the first light source 561 and the second light source 563, and a lens 570 may be inserted in front of the light source such that a predetermined area is irradiated with light. The first light source 561 may be disposed at a first distance from the camera 525, and the second light source 563 may be disposed at a second distance from the camera 525. The first distance may be shorter than the second distance. For example, the first distance may be within about 10 mm. A first power controller 545 may adjust the intensity of the first light source 561, and a second power controller 550 may adjust the intensity of the second light source 563. The first power controller 545 or the second power controller 550 may adjust the amount of light according to the transmissivity of the display 230. An analyzer 535 may analyze an image transmitted from the image sensor, and may determine whether the object in the image is a real person (e.g., live, true) or an imitation (e.g., fake, false) such as an image on a piece of paper. The analyzer 535 may control, based on the determination result, the first power controller 545 or the second power controller 550 to randomly drive the first light source 561 or the second light source 563. The first light source 561 may be disposed at a distance (e.g., within about 10 mm) to the camera 525, at which the red-eye effect occurs, and the second light source 563 may be disposed at a distance (e.g., about 25 mm to 50 mm) at which the red-eye effect does not occur. The drawing illustrates that two light sources are included, but the instant disclosure is not so limited and may include more than two light sources, for example. The first power controller 545, the second power controller 550 or the analyzer 535 may operate under control of a processor (e.g., the processor 120 in FIG. 1). The drawing illustrates that separate light sources are included, but a light source included in the display 230 may be used as one of the light sources.

Figure 8A:
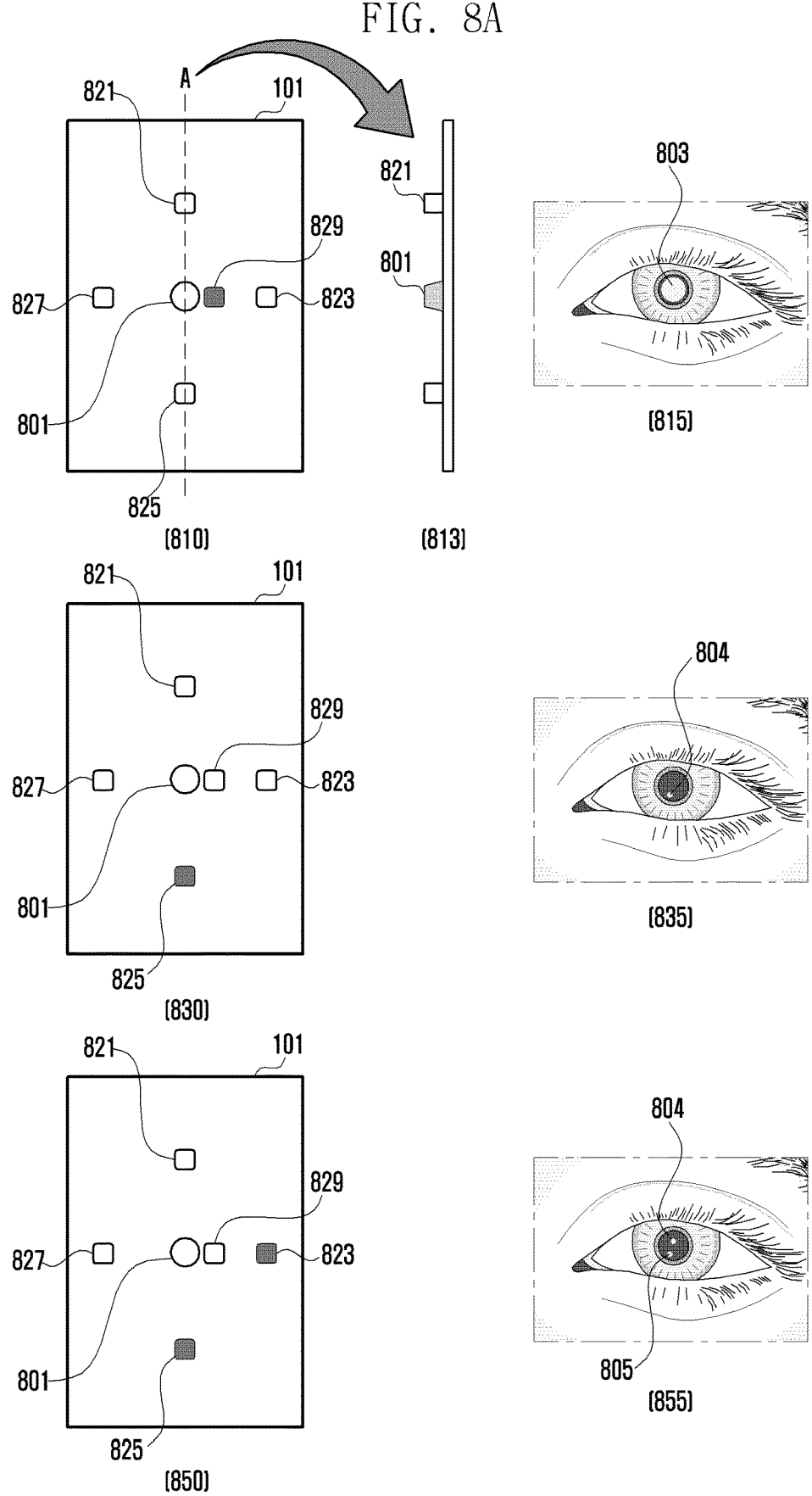
FIGS. 8A and 8B illustrate an example of authenticating biometric liveness by randomly driving a light source in an electronic device according to an embodiment.
Figure 8B:
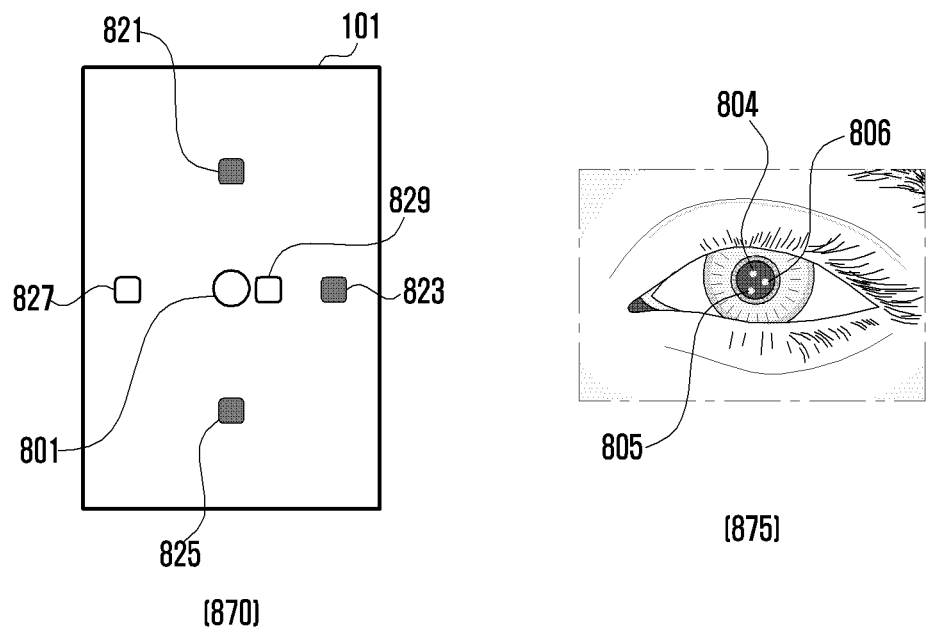
Figure 8B:
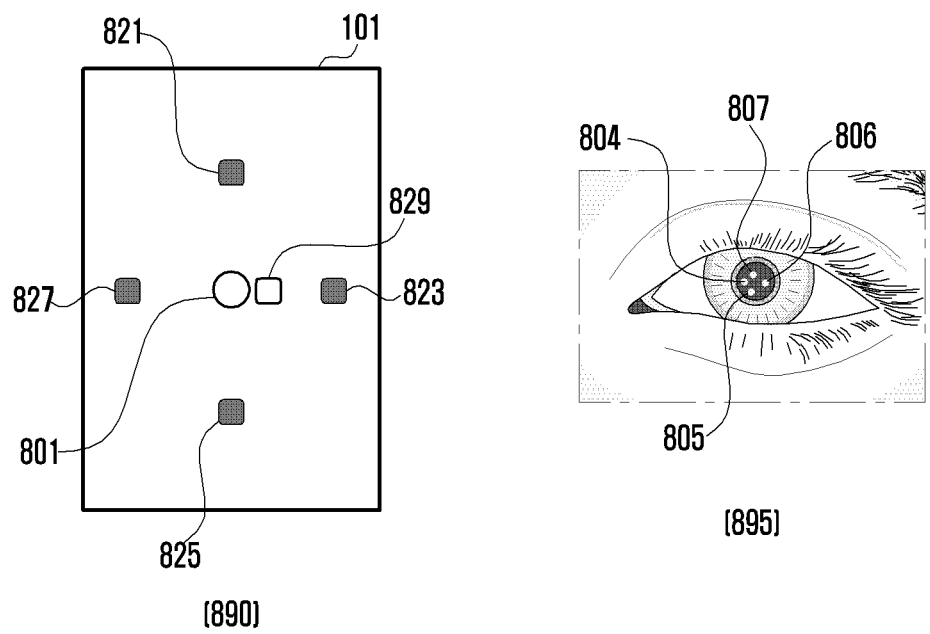
Figure 9A:
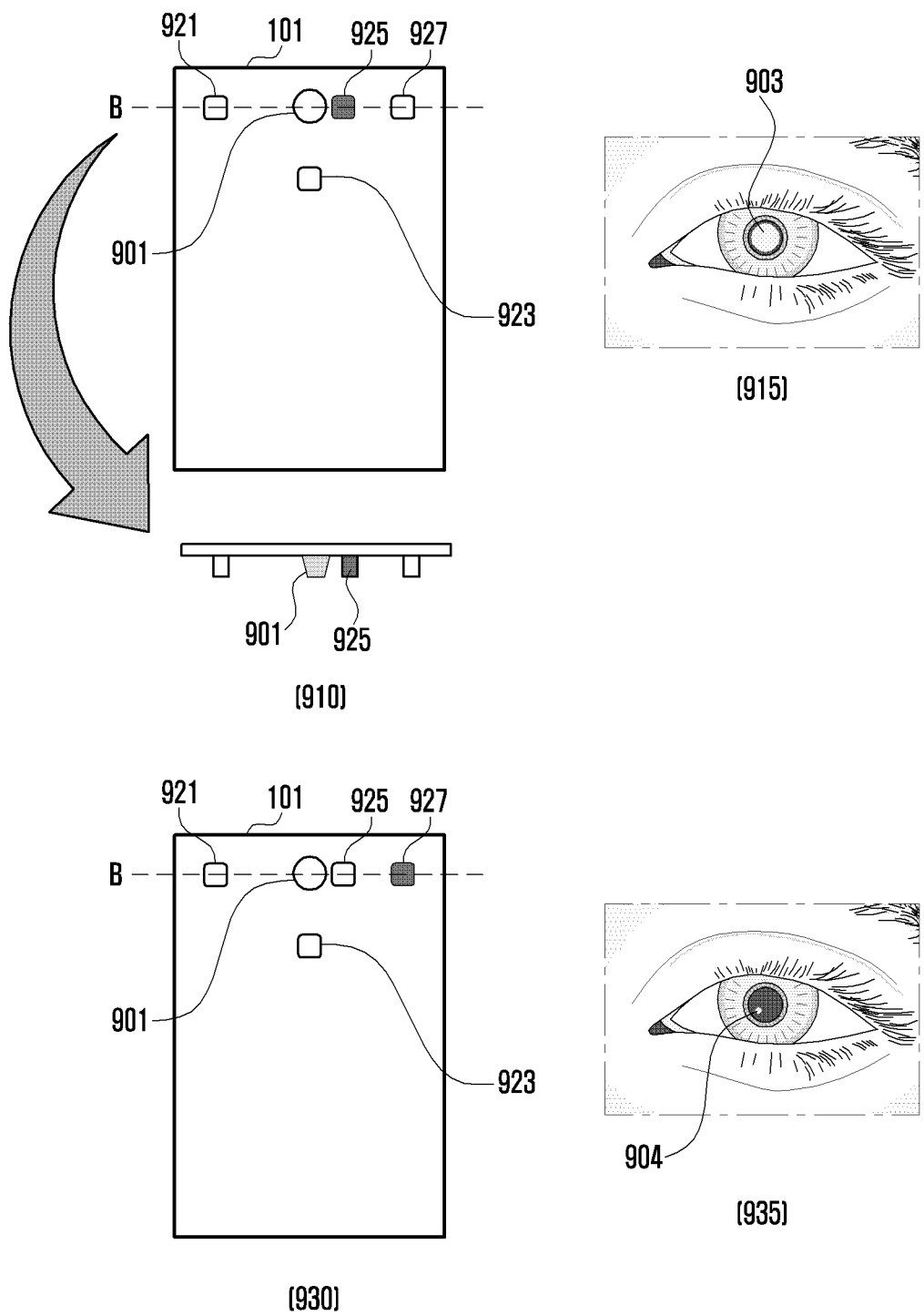
FIGS. 9A and 9B illustrate another example of authenticating biometric liveness by randomly driving a light source in an electronic device according to an embodiment.
Figure 9B:
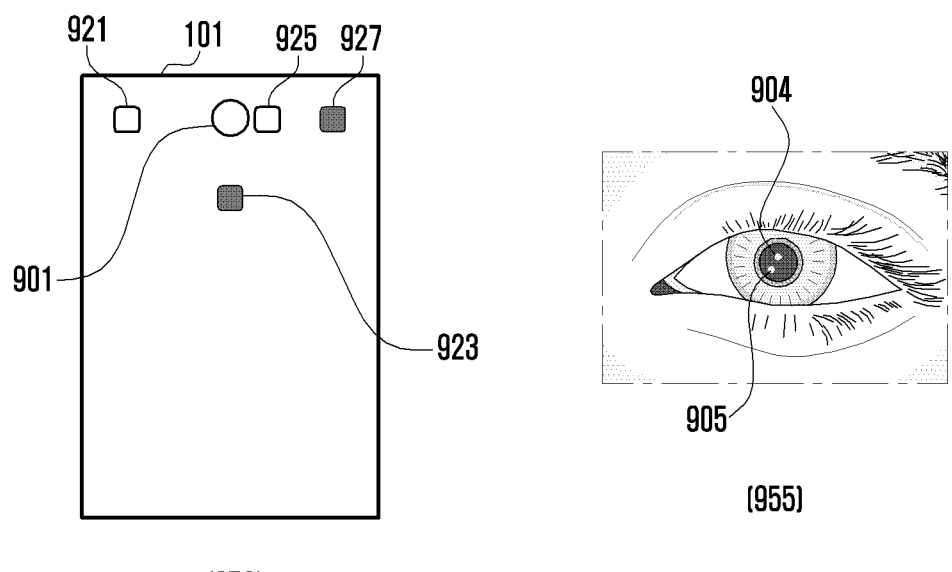
Figure 9B:
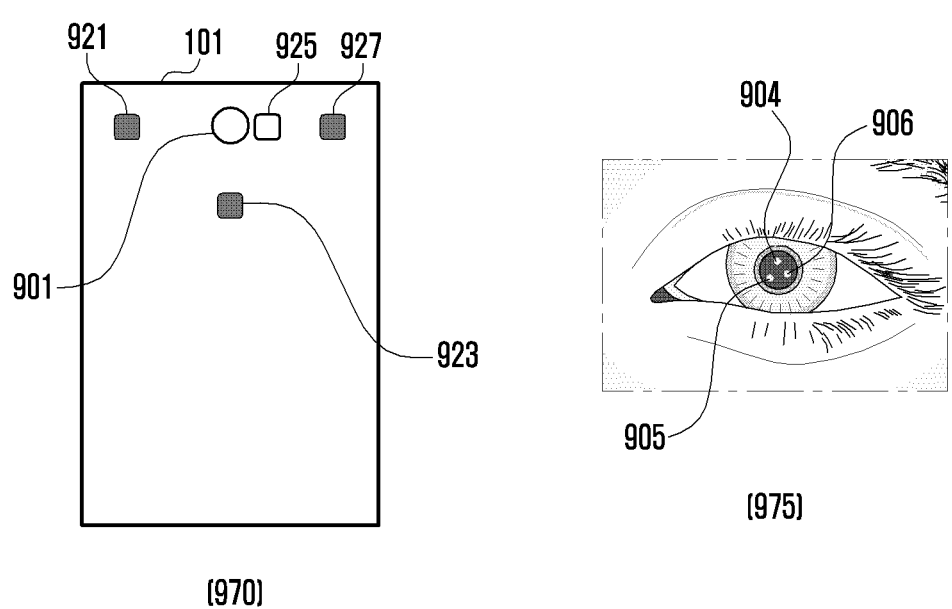

An electronic device (e.g., the electronic device 101 in FIG. 1) according to an embodiment may include a display (e.g., the display module 160 in FIG. 1 or the display 230 in FIGS. 2A and 2B), a camera module (e.g., the camera module 180 in FIG. 1 or the camera modules 250 and 255 in FIGS. 2A and 2B) disposed under the display, at least one light source (e.g., a first light source 821 to a fifth light source 829 in FIGS. 8A and 8B or a first light source 921 to a fourth light source 927 in FIGS. 9A and 9B) disposed to correspond to the camera module, a memory (e.g., the memory 130 in FIG. 1), and a processor (e.g., the processor 120 in FIG. 1) operatively connected to the display, the camera module, the light source, and/or the memory, wherein the processor is configured to drive the camera module and the at least one light source in response to a request for biometric authentication, acquire a face image from the camera module, analyze the face image produced at least in part by light emitted from the driven at least one light source, and perform the biometric authentication based on the analysis result.

The at least one light source may include a first light source (e.g., a fifth light source 829 in FIGS. 8A and 8B, or a third light source 925 in FIGS. 9A and 9B) disposed at a first distance from the camera module and a second light source (e.g., a first light source 821 to a fourth light source 827 in FIGS. 8A and 8B, or a first light source 921, a second light source 923, and a fourth light source 927 in FIGS. 9A and 9B) disposed at a second distance from the camera module, and the first distance may be shorter than the second distance.

The processor may be configured to determine whether a red-eye effect is detected from an eye included in the face image when the first light source is driven, and determine whether a specular highlight is detected from the eye included in the face image when the second light source is driven.

The processor may be configured to determine whether the size of a reflected ray detected from the eye is larger than a predetermined reference value when the first light source is driven, determine biometric verification to be successful when the size of the reflected ray is larger than the predetermined reference value, and determine biometric verification to be unsuccessful when the reflected ray is not detected from the eye or when the size of the reflected ray is smaller than the predetermined reference value.

The processor may be configured to determine whether the size of a reflected ray detected from the eye appears smaller than a predetermined reference value when the second light source is driven, determine biometric verification to be successful when the size of the reflected ray is smaller than the predetermined reference value, and determine biometric verification to be unsuccessful when the reflected ray is not detected from the eye or when the size of the reflected ray is larger than the predetermined reference value.

The electronic device may further include a third light source (e.g., a first light source 821 to a fourth light source 827 in FIGS. 8A and 8B, or a first light source 921, a second light source 923, and a fourth light source 927 in FIGS. 9A and 9B) disposed at the second distance from the camera module, and the processor may be configured to drive one of the second light source or the third light source to acquire a first face image, determine whether one reflected ray is detected from an eye included in the first face image, when one reflected ray is detected from the eye included in the first face image, drive the second light source and the third light source to acquire a second face image, determine whether two reflected rays are detected from an eye included in the second face image, determine biometric verification to be successful when two reflected rays are detected from the eye included in the second face image, and determine biometric verification to be unsuccessful when reflected rays are not detected from the eye or when more or less than two reflected rays are detected from the eye included in the second face image.

The at least one light source may be configured to be an infrared ray (IR) light-emitting diode (LED).

To perform the biometric authentication, the processor may be configured to determine whether the acquired face image corresponds to a face image stored in the memory, and determine biometric liveness by using the light emitted from the driven at least one light source.

The processor may be configured to perform a function related to the biometric authentication when the number of reflected rays detected from an eye included in the face image corresponds to the number of the driven at least one light source and when the acquired face image corresponds to the face image stored in the memory.

The processor may be configured to determine, based on the security level of the biometric authentication, the number of times biometric liveness is to be determined based on the light emitted from the driven at least one light source.

Figure 6:
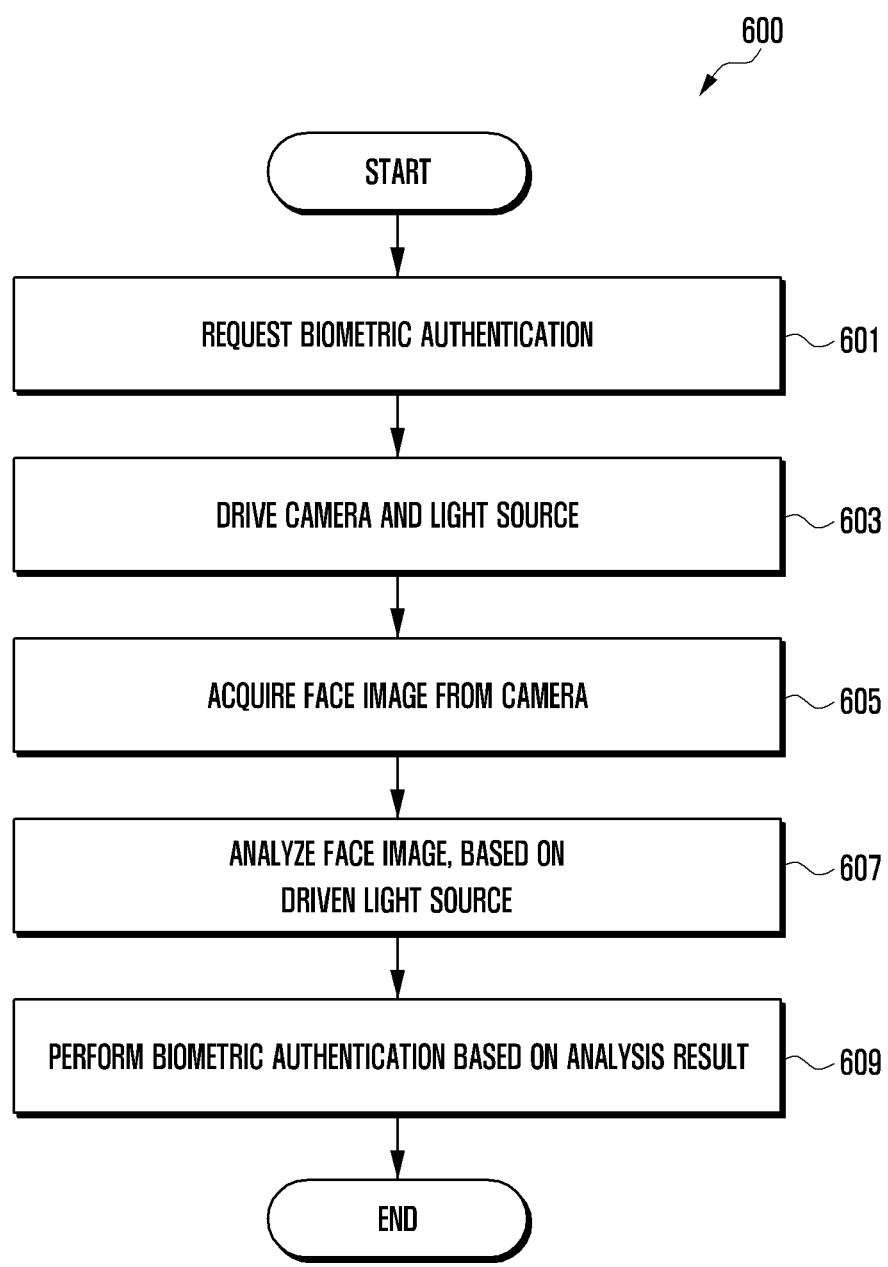
FIG. 6 is a flowchart illustrating a method for operating an electronic device according to an embodiment.

FIG. 6 is a flowchart 600 illustrating a method for operating an electronic device according to an embodiment.

Referring to FIG. 6, in operation 601, a processor (e.g., the processor 120 in FIG. 1) of an electronic device (e.g., the electronic device 101 in FIG. 1) according to an embodiment may be requested to perform biometric authentication. The biometric authentication may be extracting and authenticating various types of biometric information acquirable from the user, such as fingerprint, iris, face, voice, or vein patterns of the back of the user's hand. The biometric authentication may be requested for unlocking of the electronic device 101, financial transaction services or payment services, or certain application configurations. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

In operation 603, the processor 120 may drive a camera (e.g., the camera module 180 in FIG. 1 or the camera modules 250 and 255 in FIGS. 2A and 2B) and a light source (e.g., the first light source 561 and the second light source 563 in FIG. 5). The camera module 180 may be an under-display camera (UDC) disposed under (e.g., the −z-axis direction in FIG. 3) a display (e.g., the display module 160 in FIG. 1). For example, for biometric authentication, the processor 120 may drive the camera module 250 disposed in the front surface of the electronic device 101. Further, the processor 120 may drive a light source in order to determine biometric liveness together with biometric authentication. The light source may be disposed to be positioned at a predetermined distance from the camera module 180. For example, the first light source 561 and the second light source 563 may be disposed under the display module 160, and IR LEDs may be used. If an IR LED is used as a light source, the user may not be able to see the light emitted from the IR LED. The electronic device 101 may include at least one light source. When multiple light sources are included, the processor 120 may drive one or more of the multiple light sources. According to an embodiment, a light source included in the display module 160 may be used as a light source to be driven.

In operation 605, the processor 120 may acquire a face image from the camera. The face image includes the user's face, and may include only a partial area of the user's face according to an embodiment. For example, the face image may include the entire face of the user, or a part of the face. For example, setting aside liveness detection, when the user's face is used for biometric recognition, the processor 120 may acquire the entirety of the user's face as the face image. Alternatively, when the user's iris is used for biometric authentication, the processor 120 may acquire an image including the user's eye(s) as the face image.

In operation 607, the processor 120 may analyze the face image, based on the driven light source. When one light source is driven, the processor 120 may analyze whether light ray(s) are reflected by an eye of the face image. A reflected ray reflected by the eye may refer to a ray which has been emitted from a light source and reflected by the user's eye. The reflected ray may produce a specular highlight or a red-eye effect. Even when IR LEDs are used as light sources, a highlight due to reflection may be appear in the captured eye image, and the specular highlight may vary depending on the angle between the light source and the camera and the number of light sources. The specular highlight may not be detected when the authentication is faked (e.g. when a photograph of the face of the user is used for authentication), and biometric liveness may be detected by analyzing the eye image captured while changing the number and position of light sources.

Further, as disclosed above, the red-eye effect may refer to the effect in which the pupil of a person appears red when the image of the person is captured using a flash in a dark environment. The red-eye effect and the specular highlight may be different from each other in at least one of size, color, or shape. For example, the size of the red-eye effect may be larger than the size of the specular highlight.

According to an embodiment, when the distance between the camera (e.g., image sensor) and a light source is less than a particular threshold, the red-eye effect may occur, and thus the size of the corresponding reflected ray (e.g., rays of the red-eye effect) is large. When the distance between the camera and the light source increases, the size of the corresponding reflected ray (e.g., rays of the specular highlight) may be small. The processor 120 may recognize a face from the acquired face image and detect an eye, based on the face recognition, to perform an operation for biometric liveness determination. Alternatively, the processor 120 may detect an eye from the face image to perform an operation for biometric liveness determination.

For example, the electronic device may include two light sources. A first light source may be disposed at a close distance (e.g., first distance) to the camera, and a second light source may be disposed at a relatively far distance (e.g., second distance) from the camera compared with the first light source. A reflected ray of an eye of the face image acquired after driving the first light source corresponds to the red-eye effect, and thus may appear larger than when the second light source is driven. When the size of the reflected ray of the eye of the face image acquired after driving the first light source appears larger than a predetermined reference value, the processor 120 may determine that biometric verification is successful (e.g., live, true). When the size of the reflected ray appears smaller than the predetermined reference value, the processor 120 may determine that biometric verification is unsuccessful (e.g., fake, false). Alternatively, when the size of the reflected ray of the eye of the face image after driving the second light source appears smaller than the predetermined reference value, the processor 120 may determine that biometric verification is successful (e.g., live, true), and when the size of the reflected ray of the eye appears larger than the predetermined reference value, the processor 120 may determine that biometric verification is unsuccessful (e.g., fake, false).

According to an embodiment, three light sources may be included in the electronic device, a first light source may be disposed close to the camera, and a second light source and a third light source may be disposed at a relatively far distance from the camera compared with the first light source. One reflected ray of an eye of the face image acquired after driving the second light source may be detected, and two reflected rays of the eye of the face image acquired after driving the second light source and the third light source may be detected. When the number of reflected rays of the eye of the face image corresponds to (e.g., is equal to) the number of driven light sources, the processor 120 may determine that biometric verification is successful (e.g., live, true). When the number of reflected rays of the eye of the face image does not correspond to the number of driven light sources, the processor 120 may determine that biometric verification is unsuccessful (e.g., fake, false).

In operation 609, the processor 120 may perform biometric authentication based on the analysis result. The biometric authentication may include biometric authentication and biometric liveness determination. The biometric authentication may be determining whether a subject whose image is captured corresponds to biometric information (e.g., face, fingerprint, or iris) of the user, stored in a memory (e.g., the memory 130 in FIG. 1), and the biometric liveness determination may be determining, based on light source(s), whether the subject corresponds to a real person and not an imitation. The processor 120 may determine, based on the analysis result, biometric authentication and biometric liveness. When biometric authentication and biometric liveness determination are successful, the processor 120 may allow a function corresponding to the biometric authentication requested in operation 601. When biometric authentication and biometric liveness determination are unsuccessful, the processor 120 may not allow the function corresponding to the biometric authentication requested in operation 601.

According to an embodiment, a face image may be acquired for biometric liveness determination. When biometric authentication using a face image is possible, the processor 120 may perform biometric authentication by using the face image acquired in operation 605. Alternatively, when biometric authentication using a face image is impossible (e.g., fingerprint authentication), the processor 120 may further request biometric information for biometric authentication.

According to an embodiment, the processor 120 may selectively determine biometric liveness, based on the security level (or type) of the biometric authentication requested in operation 601. For example, when biometric authentication is requested in relation to a financial transaction or a payment service, the processor 120 may determine biometric liveness by determining both the red-eye effect and the specular highlight for security improvement. Alternatively, when biometric authentication is requested in relation to unlocking the electronic device 101, the processor 120 may perform biometric liveness determination by determining only the red-eye effect or only the specular highlight. The security level of biometric authentication may be configured in an application, or may be configured by the user or the manufacturer of the electronic device 101.

Figure 7:
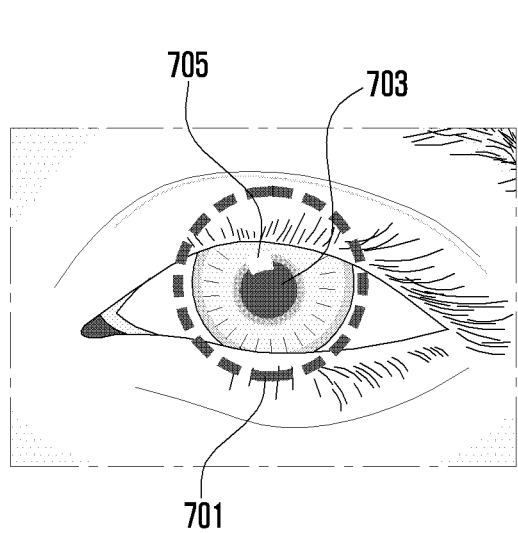
FIG. 7 illustrates an example in which a reflected ray generated by a light source is detected from a user's eye according to an embodiment.
Figure 7:
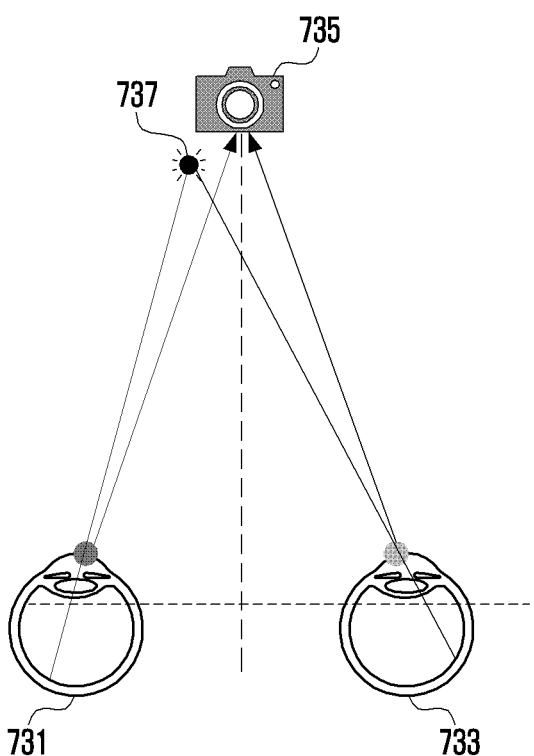

FIG. 7 illustrates an example in which a reflected ray generated by a light source is detected from a user's eye according to an embodiment.

Referring to FIG. 7, a processor (e.g., the processor 120 in FIG. 1) of an electronic device (e.g., the electronic device 101 in FIG. 1) according to an embodiment may acquire an eye image 710 from a camera 735 (e.g., the camera module 180 in FIG. 1, or the camera modules 250 and 255 in FIGS. 2A and 2B). The electronic device 101 may include at least one light source 737 close or adjacent (e.g., first distance) to the camera 735 or at a predetermined distance (e.g., second distance) therefrom. Referring to the diagram 750, light emitted from the light source 737 is reflected by two eyes 731 and 733 of the user, and thus a reflected ray 705 may appear in the image of the eye. Referring to the eye image 710, the reflected ray 705 may appear in a cornea 701 so as to be adjacent to a pupil 703. The reflected ray 705 may produce a specular highlight or the red-eye effect, and, in FIG. 7, an illustration of the specular highlight is shown. When a light source disposed close or adjacent to the camera 735 is driven, the red-eye effect may occur, and when a light source disposed at the predetermined distance (e.g., the second distance) from the camera 735 is driven, the specular highlight may appear. For example, the size of the reflected ray of the red-eye effect may be larger than the size of the reflected ray of the specular highlight.

FIGS. 8A and 8B illustrate an example of authenticating biometric liveness by randomly driving a light source in an electronic device according to an embodiment.

Referring to FIG. 8A, an electronic device (e.g., the electronic device 101 in FIG. 1) according to an embodiment may include a camera 801 (e.g., the camera module 180 in FIG. 1, or the camera modules 250 and 255 in FIGS. 2A and 2B) and at least one light source 821, 823, 825, 827, or 829 (e.g., the first light source 561 and the second light source 563 in FIG. 5). The camera 801 may be an under-display camera (UDC) disposed under a display (e.g., the display module 160 in FIG. 1). The first light source 821, the second light source 823, the third light source 825, and the fourth light source 827 may be disposed at a predetermined distance (e.g., second distance) from the camera 801, and the fifth light source 829 may be disposed at a relatively close distance (e.g., first distance) to the camera 801, compared with the first light source 821 to the fourth light source 827. That is, the first distance may be shorter than the second distance. The first light source 821 to the fifth light source 829 may be disposed under the display module 160, and may be implemented as IR LEDs.

According to an embodiment, the camera 801 may be disposed equidistant to the two parallel longitudinal side surfaces of the electronic device 101, and the at least one light source 821, 823, 825, 827, or 829 may be disposed about the camera 801. In the drawing, it is illustrated that distances by which the first light source 821 to the fourth light source 827 are spaced apart from the camera 801 are equal or similar to each other. However, the distances by which the first light source 821 to the fourth light source 827 are spaced apart from the camera 801 may be different from each other. First embodiment 810 to fifth embodiment 890 show the front view of the electronic device 101, and a cross-sectional view 813 is a cross-sectional view of the electronic device 101, taken along line A. Eye images described below may be part of face images. That is, an eye image may be acquired as a face image, and the eye image may be enlarged (or extracted) from in the face image.

The first embodiment 810 shows an example in which the fifth light source 829 is driven. When the fifth light source 829 is driven, the size of a first reflected ray 803 (e.g., corresponding to the red-eye effect) in an acquired first eye image 815 may appear relatively large. The fifth light source 829 is disposed at the first distance from the camera 801. When the distance between the camera 801 and the fifth light source 829 is relatively short, the size of the first reflected ray 803 may be relatively large for the red-eye effect. When the size of the first reflected ray 803, which is caused by driving the fifth light source 829 and is detected from the first eye image 815, appears larger than a predetermined reference value, the processor (e.g., the processor 120 in FIG. 1) of the electronic device 101 may determine that biometric verification is successful. When the size of the first reflected ray 803 appears smaller than the predetermined reference value or no reflected ray is detected, the processor may determine that biometric verification is unsuccessful.

A second embodiment 830 shows an example in which the third light source 825 is driven. When the third light source 825 is driven, a second reflected ray 804 (e.g., corresponding to the specular highlight) may appear in an acquired second eye image 835. The third light source 825 is disposed at the second distance from the camera 801, and thus the size of the second reflected ray 804 may appear relatively small compared with the first embodiment 810. The processor 120 may determine biometric liveness, based on whether the second reflected ray 804, caused acquired by driving the third light source 825, is detected from the second eye image 835. For example, when the one second reflected ray 804 is detected from the second eye image 835, the processor 120 may determine that biometric verification is successful. When the second reflected ray 804 is not detected from the second eye image 835 or when more than one reflected ray is reflected, the processor 120 may determine that biometric verification is unsuccessful.

A third embodiment 850 shows an example in which the second light source 823 and the third light source 825 are driven. When the second light source 823 and the third light source 825 are driven, two reflected rays (e.g., a second reflected ray 804 and a third reflected ray 805) (e.g., corresponding to specular highlights) may appear in an acquired third eye image 855. The second light source 823 and the third light source 825 are disposed at the second distance from the camera 801, and thus the size of the reflected rays 804 and 805 may appear relatively small compared with the first embodiment 810. The processor 120 may determine biometric liveness, based on whether two reflected rays 804 and 805 that are caused by driving the second light source 823 and the third light source 825 are detected from the third eye image 855. For example, when the two reflected rays 804 and 805 are detected from the third eye image 855, the processor 120 may determine that biometric verification is successful. When the reflected rays 804 and 805 are not detected from the third eye image 855 or when more or less than two reflected rays are detected, the processor 120 may determine that biometric verification is unsuccessful.

Referring to FIG. 8B, a fourth embodiment 870 shows an example in which the first light source 821, the second light source 823, and the third light source 825 are driven. When the first light source 821 to the third light source 825 are driven, three reflected rays (e.g., a second reflected ray 804, a third reflected ray 805, and a fourth reflected ray 806) (e.g., corresponding to specular highlights) may appear in an acquired fourth eye image 875. The first light source 821 to the third light source 825 are disposed at the second distance from the camera 801, and thus the size of the second reflected ray 804 to the fourth reflected ray 806 may appear relatively small compared with the first embodiment 810. The processor 120 may determine biometric liveness, based on whether three reflected rays 804, 805, and 806, caused by driving the first light source 821 to the third light source 825, are detected from the fourth eye image 875. For example, when the three reflected rays 804, 805, and 806 are detected from the fourth eye image 875, the processor 120 may determine that biometric verification is successful. When, the reflected rays 804, 805, and 806 are not detected from the fourth eye image 875, or when more or less than three reflected rays are detected, the processor 120 may determine that biometric verification is unsuccessful.

The fifth embodiment 890 shows an example in which the first light source 821, the second light source 823, the third light source 825, and the fourth light source 827 are driven. When the first light source 821 to the fourth light source 827 are driven, four reflected rays (e.g., a second reflected ray 804, a third reflected ray 805, a fourth reflected ray 806, and a fifth reflected ray 807) (e.g., corresponding to specular highlights) may appear in an acquired fifth eye image 895. The first light source 821 to the fourth light source 827 are disposed at the second distance from the camera 801, and thus the size of the second reflected ray 804 to the fifth reflected ray 807 may appear relatively small compared with the first embodiment 810. The processor 120 may determine biometric liveness, based on whether four reflected rays 804, 805, 806, and 807, caused by driving the first light source 821 to the fourth light source 827, are detected from the fifth eye image 895. For example, when the four reflected rays 804, 805, 806, and 807 are detected from the fifth eye image 895, the processor 120 may determine that biometric verification is successful. When the reflected rays 804, 805, 806, and 807 are not detected from the fifth eye image 895, or when more or less than four reflected rays are detected, the processor may determine that biometric verification is unsuccessful.

According to an embodiment, the detection position or direction of a reflected ray may be differently detected based on the arrange position of a light source. For example, when two light sources arranged in the upward/downward direction are driven, positions of two reflected rays are divided in the upward/downward direction. Alternatively, when two light sources arranged in the leftward/rightward direction are driven, positions of two reflected rays are divided in the leftward/rightward direction. When even the direction of a reflected ray included an eye image is divided due to the development of an analysis technique, the processor 120 may detect biometric liveness according to the number of driven light sources as well as the detection position of a reflected ray based on the arrangement position of a light source.

FIGS. 9A and 9B illustrate another example of authenticating biometric liveness by randomly driving a light source in an electronic device according to an embodiment.

Referring to FIG. 9A, an electronic device (e.g., the electronic device 101 in FIG. 1) according to an embodiment may include a camera 901 (e.g., the camera module 180 in FIG. 1, or the camera modules 250 and 255 in FIGS. 2A and 2B) and at least one light source 921, 923, 925, or 927 (e.g., the first light source 561 and the second light source 563 in FIG. 5). The camera 901 may be an under-display camera (UDC) disposed under a display (e.g., the display module 160 in FIG. 1). The first light source 921, the second light source 923, and the fourth light source 927 may be disposed at a predetermined distance (e.g., second distance) from the camera 901, and the third light source 925 may be disposed at a relatively close distance (e.g., first distance) to the camera 901, compared with the other light sources. That is, the first distance may be shorter than the second distance.

The first light source 921 to the fourth light source 927 may be disposed under the display module 160, and may be implemented as IR LEDs.

According to an embodiment, the camera 901 may be disposed at the upper portion of the electronic device 101 so as to be closer to one of the lateral sides of the electronic device 101, and the at least one light source 921, 923, 925, or 927 may be disposed about the camera 901. In the drawing, it is illustrated that distances by which the first light source 921, the second light source 923, and the fourth light source 927 are spaced apart from the camera 901 are equal or similar to each other. However, the distances by which the first light source 921, the second light source 923, and the fourth light source 927 are spaced apart from the camera 901 may be different from each other. The first embodiment 910 to the fourth embodiment 970 show a front view of the electronic device 101.

The first embodiment 910 shows an example in which the third light source 925 is driven. When the third light source 925 is driven, the size of a first reflected ray 903 (e.g., corresponding to the red-eye effect) in an acquired first eye image 915 may appear relatively large. The third light source 925 is disposed at the first distance from the camera 901, and thus when the distance between the camera 901 and the third light source 925 is the first distance, that is, relatively short compared to the other light sources, the size of the first reflected ray 903 may be relatively large for the red-eye effect. When the third light source 925 is driven and when the size of the first reflected ray 903 detected from the acquired first eye image 915 appears larger than a predetermined reference value, the processor (e.g., the processor 120 in FIG. 1) of the electronic device 101 may determine that biometric verification is successful. When the size of the reflected ray appears smaller than the predetermined reference value, or when the reflected ray is not detected, the processor may determine that biometric verification is unsuccessful.

The second embodiment 930 shows an example in which the fourth light source 927 is driven. When the fourth light source 927 is driven, a second reflected ray 904 (e.g., corresponding to the specular highlight) may appear in an acquired second eye image 935. The fourth light source 927 is disposed at the second distance from the camera 901, and thus the size of the second reflected ray 904 may appear relatively small compared with the first embodiment 910. The processor 120 may determine biometric liveness, based on whether one second reflected ray 904, caused by driving the fourth light source 927. is detected from the second eye image 935. For example, when the one second reflected ray 904 is detected from the second eye image 935, the processor 120 may determine that biometric verification is successful. When the second reflected ray 904 is not detected from the second eye image 935, or when more or one reflected ray is detected, the processor 120 may determine that biometric verification is unsuccessful.

Referring to FIG. 9B, the third embodiment 950 shows an example in which the second light source 923 and the fourth light source 927 are driven. When the second light source 923 and the fourth light source 927 are driven, two reflected rays (e.g., second reflected ray 904 and third reflected ray 905 corresponding to specular highlight) may appear in an acquired third eye image 955. The second light source 923 and the fourth light source 927 are disposed at the second distance from the camera 901, and thus the size of the second reflected ray 904 and the third reflected ray 905 may appear relatively small compared with the first embodiment 910. The processor 120 may determine biometric liveness, based on whether two reflected rays 904 and 905, caused by driving the second light source 923 and the fourth light source 927, are detected from the third eye image 955 acquired. For example, when the two reflected rays 904 and 905 are detected from the third eye image 955, the processor 120 may determine that biometric verification is successful. When the reflected rays 904 and 905 are not detected from the eye image 955, or when more or less than two reflected rays are detected, the processor 120 may determine biometric verification is unsuccessful.

The fourth embodiment 970 shows an example in which the first light source 921, the second light source 923, and the fourth light source 927 are driven. When the first light source 921, the second light source 923, and the fourth light source 927 are driven, three reflected rays (e.g., second reflected ray 904, third reflected ray 905, and fourth reflected ray 906 corresponding to specular highlight) may appear in an acquired fourth eye image 975. The first light source 921, the second light source 923, and the fourth light source 927 are disposed at the second distance from the camera 901, and thus the size of the second reflected ray 904 to the fourth reflected ray 906 may appear relatively small compared with the first embodiment 910. The processor 120 may determine biometric liveness, based on whether three reflected rays 904, 905, and 906, caused by driving the first light source 921, the second light source 923, and the fourth light source 927, are detected from the fourth eye image 975 acquired by driving the first light source 921, the second light source 923, and the fourth light source 927. For example, when the three reflected rays 904, 905, and 906 are detected from the fourth eye image 975, the processor 120 may determine that biometric verification is successful. When the reflected rays 904, 905, and 906 are not detected from the fourth eye image 975, or when more or less than three reflected rays are detected, the processor 120 may determine that biometric verification is unsuccessful.

Figure 10:
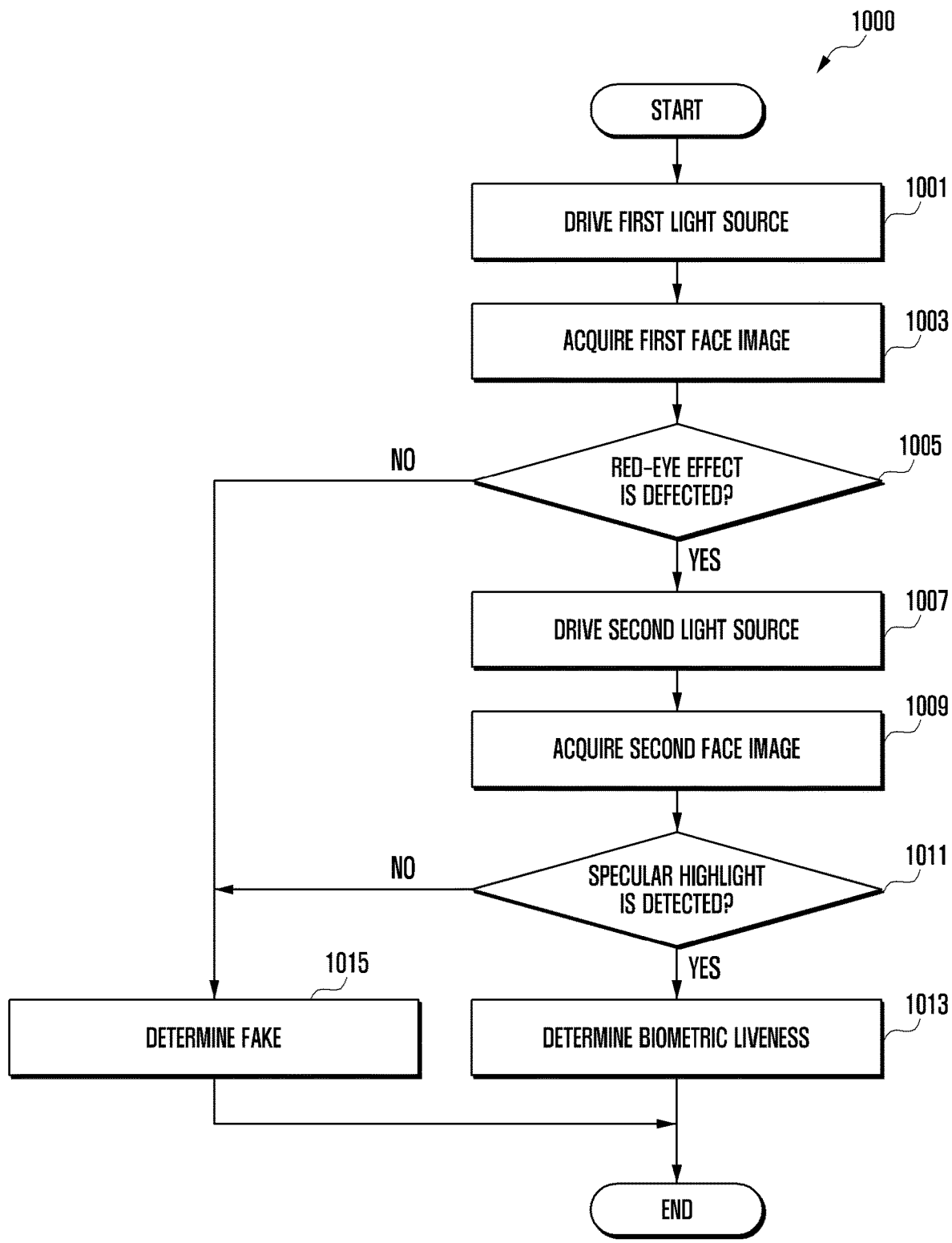
FIG. 10 is a flowchart illustrating a biometric liveness authentication method of an electronic device according to an embodiment.

FIG. 10 is a flowchart 1000 illustrating a biometric liveness authentication method by an electronic device according to an embodiment. Operations in FIG. 10 may be specified operations of operations 603 to 609 in FIG. 6.

Referring to FIG. 10, in operation 1001, a processor (e.g., the processor 120 in FIG. 1) of an electronic device (e.g., the electronic device 101 in FIG. 1) according to an embodiment may drive a first light source. The first light source may be disposed close (e.g., first distance) to a camera (e.g., the camera module 180 in FIG. 1, or the camera modules 250 and 255 in FIGS. 2A and 2B), or may be disposed to be spaced (e.g., second distance) apart from the camera. For example, the first light source may be one of the first light source 821 to the fourth light source 827 in FIGS. 8A and 8B, or may be the fifth light source 829. For example, the first light source 821, the second light source 823, the third light source 825, and the fourth light source 827 may be disposed at a predetermined distance (e.g., the second distance) from the camera 801, and the fifth light source 829 may be disposed at a relatively close distance (e.g., the first distance) to the camera 801, compared with the first light source 821 to the fourth light source 827. Alternatively, the first light source may be one of the first light source 921, the second light source 923, and the fourth light source 927 in FIGS. 9A and 9B, or may be the third light source 925. The first light source 921, the second light source 923, and the fourth light source 927 may be disposed at a predetermined distance (e.g., the second distance) form the camera 901, and the third light source 925 may be disposed at a relatively close distance (e.g., the first distance) to the camera 901 compared with the other light sources.

Hereinafter, in the description, an example in which the fifth light source 829 (or the third light source 925 in FIGS. 9A and 9B) disposed at the first distance from the camera is driven may be described. FIG. 10 is primarily concerned with light source driving, but the camera may also be driven during light source driving.

In operation 1003, the processor 120 may acquire a first face image from the camera module 180. The first face image may include an eye image. The camera module 180 may be an under-display camera (UDC) disposed under a display (e.g., the display module 160 in FIG. 1). For example, for biometric authentication, the processor 120 may drive the camera module 250 disposed at the front surface of the electronic device 101.

In operation 1005, the processor 120 may analyze the acquired first face image to determine whether the red-eye effect is detected. In operation 1001, the fifth light source 829 disposed close to the camera module 180 was driven, and thus the red-eye effect may be produced by a reflected ray of the user's eye. The processor 120 may analyze, based on the distance between the first light source and the camera module 180, whether the size of the reflected ray exceeds a predetermined reference value. For example, the fifth light source 829 disposed close to the camera module 180 was driven in operation 1001, and thus the processor 120 may determine whether the red-eye effect is detected, by determining whether a reflected ray is detected from the first face image and the size of the detected reflected ray appears larger than the predetermined reference value.

According to an embodiment, the red-eye effect and the specular highlight may be different from each other in at least one of size, color, or shape. The processor 120 may analyze at least one of the size, color, or the shape of the reflected ray detected from the first face image to determine whether the red-eye effect has occurred. For example, the size of the reflected ray of the red-eye effect may be larger than the size of the reflected ray of the specular highlight.

According to an embodiment, when the distance between the first light source (e.g., the fifth light source 829 in FIGS. 8A and 8B or the third light source 925 in FIGS. 9A and 9B) and the camera module 180 has a value equal to or smaller than a distance reference value, the processor 120 may then determine whether the size of the reflected ray detected from the eye in the first face image appears larger than the predetermined reference value. The distance reference value may be configured based on the spacing distance between the light source and the camera, and may be greater than the first distance and smaller than the second distance. According to an embodiment, if the distance between the first light source and the camera module 180 has a value equal to or smaller than the distance reference value, the processor 120 may perform operation 1015 when a reflected ray is not detected from the eye in the first face image or when the red-eye effect is not detected (e.g., the size of a reflected ray is smaller than the predetermined reference value). Alternatively, when the reflected ray having a size smaller than the predetermined reference value is detected, the processor 120 may adjust the intensity of the first light source to acquire the face image again and determine biometric liveness.

In operation 1007, the processor 120 may drive a second light source. The second light source, which is a light source different from the first light source, may be disposed at a position different of that of the first light source. The processor 120 may randomly drive different light sources included in the electronic device 101, in order to determine biometric liveness. Like the first light source 821 to the fourth light source 827 in FIGS. 8A and 8B or the first light source 921, the second light source 923, and the fourth light source 927 in FIGS. 9A and 9B, the second light source may be a light source disposed at a predetermined distance (e.g., the second distance) from the camera module 180.

According to an embodiment, even when the red-eye effect has been detected in operation 1005, the processor 120 may further perform operations 1007 to 1011, thereby improving the security. Alternatively, the processor 120 may perform operations 1007 to 1011, based on the security level (or type) of biometric authentication. For example, if biometric authentication is requested in relation to a financial transaction or a payment service, the processor 120 may further perform operations 1007 to 1011 in order to improve the security even when the red-eye effect has been detected in operation 1005. Alternatively, when biometric authentication is requested in relation to unlocking the electronic device 101, the processor 120 may perform operation 1013 or 1015 without performing operations 1007 to 1011.

In operation 1009, the processor 120 may acquire a second face image from the camera module 180. The second face image may include an eye image. The second face image may be different from the first face image acquired in operation 1003, and the face image may be acquired again by randomly driving a light source different than that used for the first face image.

In operation 1011, the processor 120 may analyze the acquired second face image to determine whether a specular highlight is detected. The second light source was driven in operation 1007, and thus the specular highlight may be produced by a reflected ray of the user's eye. According to an embodiment, the red-eye effect and the specular highlight may be different from each other in at least one of size, color, or shape. The processor 120 may analyze at least one of the size, color, or shape of a reflected ray detected from the second face image to determine whether the specular highlight is detected.

According to an embodiment, when the distance between the second light source (e.g., the first light source 821 to the fourth light source 827 in FIGS. 8A and 8B, or the first light source 921, the second light source 923, and the fourth light source 927 in FIGS. 9A and 9B) and the camera module 180 exceeds a distance reference value, the processor 120 may determine whether the size of the reflected ray of the eye included in the second face image appears smaller than the predetermined reference value.

The processor 120 may perform operation 1013 when the specular highlight is detected from the eye in the second face image, and may perform operation 1015 when a reflected ray is not detected from the eye in the second face image or when the size of a reflected ray appears larger (e.g., corresponding to the red-eye effect) than the predetermined reference value. The first light source or the second light source is an IR light source, and thus even when the light source is driven, the user may not see the emitted IR light.

In operation 1013, the processor 120 may determine biometric liveness. When biometric liveness has been determined in both operations 1005 and 1011, the processor 120 may finally determine that the biometric authentication is successful. According to an embodiment, the processor 120 may configure the number of biometric liveness determination operations, based on the security level (or type) of biometric authentication. For example, when the security level is a first level (e.g., high), biometric liveness determination may be performed three times (e.g., operations in FIG. 10 and operations 1107 to 1113 in FIG. 11). When the security level is a second level (e.g., intermediate), biometric liveness determination may be performed two times (e.g., FIG. 10 and FIG. 11). When the security level is a third level (e.g., low), biometric liveness determination may be performed once (e.g., one of operations 1001 to 1005, or operations 1007 to 1011 in FIG. 10, or operations 1107 to 1111 in FIG. 11). Alternatively, if there are two security levels, biometric liveness determination may be performed two times when the security level is a first level (e.g., high), and biometric liveness determination may be performed once when the security level is a second level (e.g., low).

In operation 1015, the processor 120 may determine that the subject is fake. When the red-eye effect is not detected from the eye in the face image, or when the specular highlight is not detected, the processor 120 may determine that biometric verification is unsuccessful. In the drawing, it is illustrated that operation 1015 is performed when the result is No after operation 1005 is performed. However, when the result is No after operation 1005 is performed, operation 1007 may be performed. There may be an error in the result of the face image analysis. Therefore, when the reflected ray corresponding to the red-eye effect is not detected in operation 1005, biometric liveness may be determined once again, and the subject may be determined to be fake when the specular highlight is not detected. This may vary depending on the setting by the user or the setting of the electronic device 101.

Figure 11:
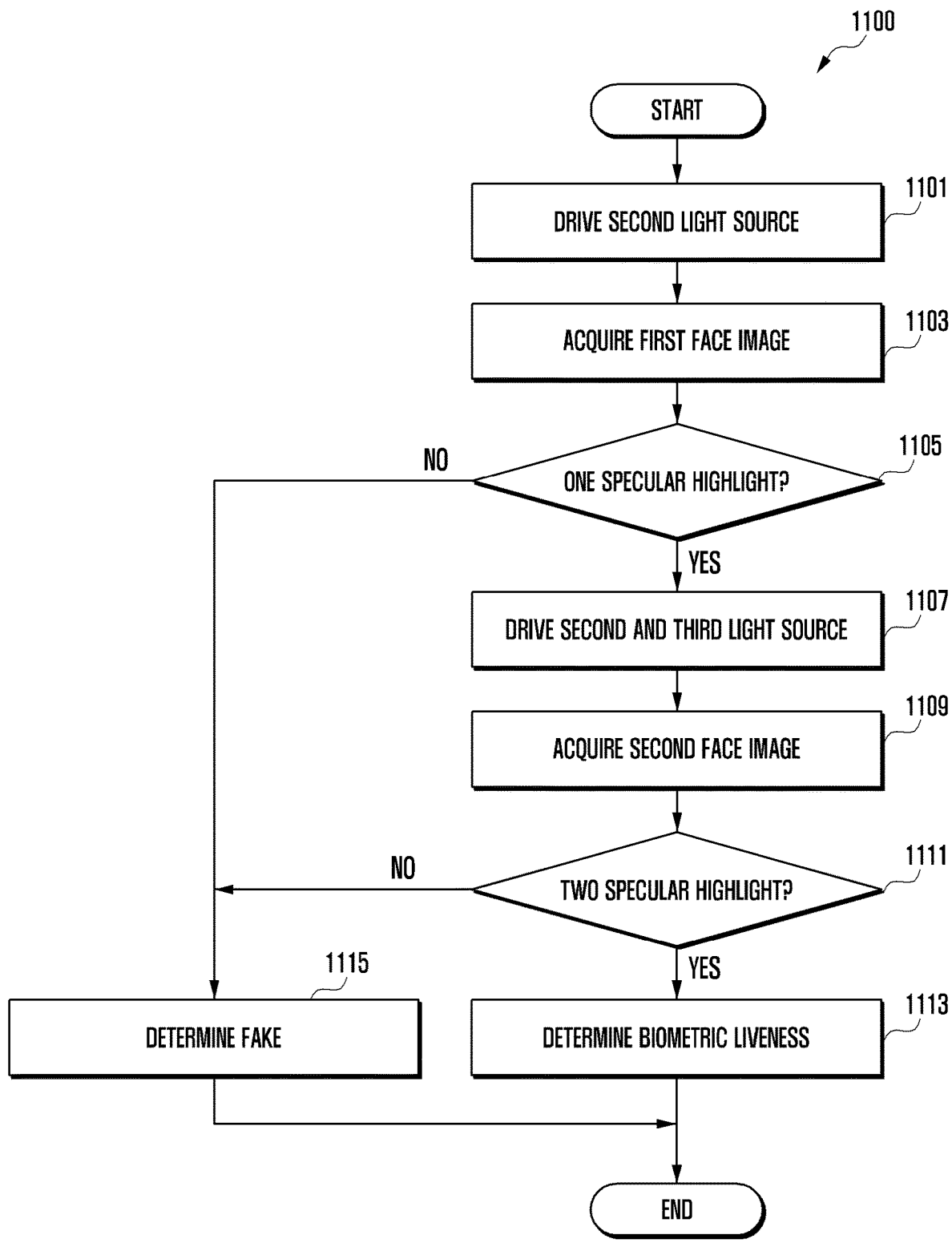
FIG. 11 is a flowchart illustrating a biometric liveness authentication method of an electronic device according to an embodiment.

According to an embodiment, the processor 120 may further perform operations 1107 to 1115 in FIG. 11 after completing the operations in FIG. 10. For example, based on the security level, the processor 120 may perform one of operations 1001 to 1005 or operations 1007 to 1011 in FIG. 10, or operations 1107 to 1111 in FIG. 11, may perform one of the operations in FIG. 10 or 11, or may perform the operations in FIG. 10 and operations 1107 to 1113 in FIG. 11.

FIG. 11 is a flowchart 1100 illustrating a biometric liveness authentication method of an electronic device according to an embodiment. Operations in FIG. 11 may implement operations 603 to operation 609 in FIG. 6.

Referring to FIG. 11, in operation 1101, a processor (e.g., the processor 120 in FIG. 1) of an electronic device (e.g., the electronic device 101 in FIG. 1) according to an embodiment may drive a second light source. The second light source may be disposed close (e.g., first distance) to a camera (e.g., the camera module 180 in FIG. 1, or the camera modules 250 and 255 in FIGS. 2A and 2B), or may be disposed to be spaced (e.g., second distance) apart from the camera. For example, the second light source may be one the first light source 821 to the fourth light source 827 in FIGS. 8A and 8B, or may be the fifth light source 829. For example, the first light source 821, the second light source 823, the third light source 825, and the fourth light source 827 may be disposed a predetermined distance (e.g., the second distance) from the camera 801, and the fifth light source 829 may be disposed at a relatively close distance (e.g., the first distance) to the camera 801, compared with the first light source 821 to the fourth light source 827. Alternatively, the second light source may be one of the first light source 921, the second light source 923, and the fourth light source 927 in FIGS. 9A and 9B, or may be the third light source 925. The first light source 921, the second light source 923, and the fourth light source 927 may be disposed a predetermined distance (e.g., the second distance) from the camera 901, and the third light source 925 may be disposed at a relatively close distance (e.g., the first distance) to compared with the other light sources.

Hereinafter, in the description, an example in which the second light source 823 (or the second light source 923 in FIGS. 9A and 9B) disposed at the second distance from the camera is driven may be described. FIG. 11 is primarily concerned with light source driving, but the camera may also be driven while the light source is driven.

In operation 1103, the processor 120 may acquire a first face image from the camera module 180. The first face image may include an eye image. The camera module 180 may be an under-display camera (UDC) disposed under a display (e.g., the display module 160 in FIG. 1). For example, for biometric authentication, the processor 120 may drive the camera module 250 disposed at the front surface of the electronic device 101.

In operation 1105, the processor 120 may analyze the first face image to determine whether one specular highlight is detected. In operation 1101, the second light source 823 disposed to be spaced apart from the camera module 180 was driven, and thus a reflected ray of the user's eye may produce a specular highlight. According to an embodiment, the red-eye effect and the specular highlight may be different from each other in at least one of size, color, or shape. The processor 120 may analyze at least one of the size, color, or shape of a reflected ray detected from the first face image to determine whether a specular highlight is detected.

Operations 1101 to 1105 in FIG. 11 are identical or similar to operations 1107 to 1011 in FIG. 10.

According to an embodiment, when the distance between the second light source and the camera module 180 exceeds a distance reference value, the processor 120 may determine whether the size of the reflected ray detected from the eye in the first face image appears smaller than a predetermined reference value. The distance reference value may be configured based on the spacing distance between the light source and the camera module 180, and may be greater than the first distance and smaller than the second distance. According to an embodiment, when the distance between the second light source and the camera module 180 exceeds the distance reference value, the processor 120 may perform operation 1115 when the reflected ray is not detected from the eye in the first face image, or when two or more reflected rays are detected, or when the size of the reflected ray is larger than the predetermined reference value.

In operation 1107, the processor 120 may drive the second light source and a third light source. The third light source is a light source different from the second light source, and may be disposed in a position different from the position of the second light source. The processor 120 may randomly drive different light sources included in the electronic device 101 to determine biometric liveness. Like the first light source 821 to the fourth light source 827 in FIGS. 8A and 8B, or like the first light source 921, the second light source 923, and the fourth light source 927 in FIGS. 9A and 9B, the third light source may be a light source disposed at the predetermined distance (e.g., the second distance) from the camera module 180. Hereinafter, in relation to the third light source, description may be made of an example in which the third light source 825 in FIGS. 8A and 8B or the fourth light source 927 in FIGS. 9A and 9B are driven.

According to an embodiment, even when one specular highlight has been detected in operation 1105, the processor 120 may further perform operations 1107 to 1111, thereby improving the security. Alternatively, the processor 120 may further perform operations 1107 to 1111, based on the security level (or type) of biometric authentication. For example, if biometric authentication is requested in relation to a financial transaction or a payment service, the processor 120 may further operations 1107 to 1111 in order to improve the security even when one specular highlight has been detected. Alternatively, when biometric authentication is requested in relation to unlocking the electronic device 101, the processor 120 may perform operation 1113 or 1115 without performing operations 1107 to 1111.

In operation 1109, the processor 120 may acquire a second face image from the camera module 180. The second face image may include an eye image. The second face image is different from the first face image acquired in operation 1103, and thus another face image may be acquired by randomly driving different light sources.

In operation 1111, the processor 120 may analyze the second face image to determine whether two specular highlights are detected. The second light source and the third light source were driven in operation 1107, and thus two specular highlight may be produced by reflected rays of the user's eye. The processor 120 may analyze at least one of the size, color, or shape of the reflected ray(s) detected from the second face image to determine whether two specular highlights are detected.

The processor 120 may perform operation 1113 when two specular highlights are detected from the eye in the second face image, and may perform operation 1115 when reflected rays are not detected from the eye in the second face image, or when the size of the reflected ray appears larger (e.g., corresponding to the red-eye effect) than a predetermined reference value, or more or less than two reflected rays are detected. The second light source and the third light source are IR light sources, and thus even when the light sources are driven, the user may not see the emitted IR light.

In operation 1113, the processor 120 may determine biometric liveness. When biometric liveness has been determined in both operations 1105 and 1111, the processor 120 may finally determine that biometric authentication is successful. According to an embodiment, the processor 120 may configure the number of biometric liveness determination operations, based on the security level (type) of biometric authentication. For example, when the security level is a first level (e.g., high), biometric liveness determination may be performed three times. When the security level is a second level (e.g., intermediate), biometric liveness determination may be performed two times. When the security level is a third level (e.g., low), biometric liveness determination may be performed once. Alternatively, if there are two security levels, biometric liveness determination may be performed two times when the security level is a first level (e.g., high), and biometric liveness determination may be performed once when the security level is a second level (e.g., low).

In operation 1115, the processor 120 may determine that biometric verification is unsuccessful. When the number of specular highlights detected from the eye in the face image does not correspond to the number of driven light sources, the processor 120 may determine that biometric verification is unsuccessful. In the drawing, it is illustrated that after operation 1105 is performed, when the result thereof is No, operation is performed. However, after operation 1105 is performed, when the result is No, operation 1107 may be performed. There may be an error in the result of the face image analysis. Therefore, when a reflected ray is not detected in operation 1105, biometric liveness may be determined once again, and a living body may be determined to be fake when a reflected ray is not detected two times or when the number of specular highlights does not correspond to the number of driven light sources. This may vary depending on the setting by the user or the setting of the electronic device 101.

Figure 12:
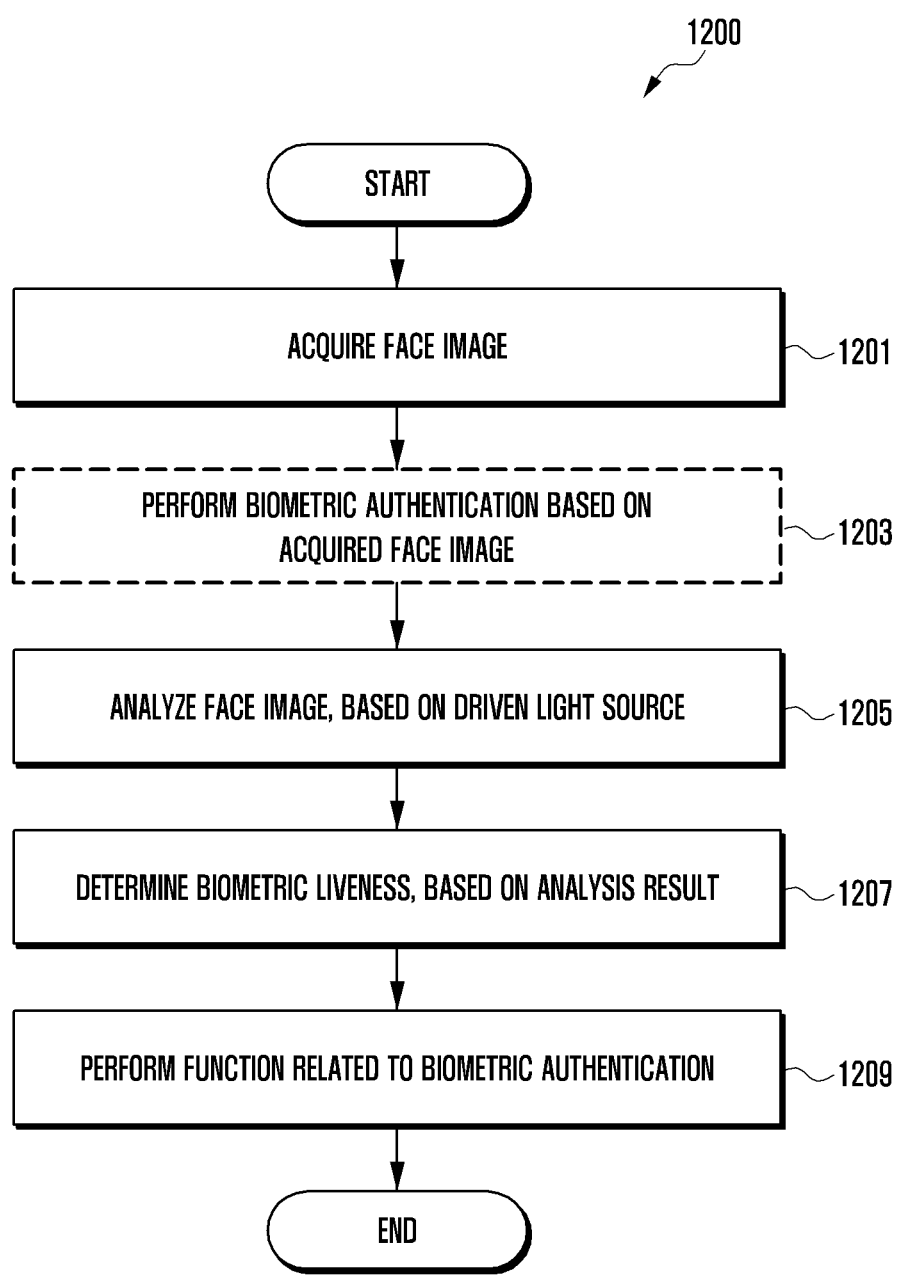
FIG. 12 is a flowchart of a biometric-authentication and liveness-authentication method of an electronic device according to an embodiment.

FIG. 12 is a flowchart 1200 of a biometric-authentication and liveness-authentication method of an electronic device according to an embodiment. Operations in FIG. 12 may be specified operations of operations 605 to 609 in FIG. 6.

Referring to FIG. 12, in operation 1201, a processor (e.g., the processor 120 in FIG. 1) of an electronic device (e.g., the electronic device 101 in FIG. 1) according to an embodiment may acquire a face image from the camera module 180. The face image may include an eye image. The camera module 180 may be an under-display camera (UDC) disposed under a display (e.g., the display module 160 in FIG. 1). For example, for biometric authentication, the processor 120 may drive the camera module 250 disposed at the front surface of the electronic device 101.

In operation 1203, the processor 120 may perform biometric authentication based on the acquired face image. The biometric authentication, which is different form biometric liveness determination, may be determining whether the face image corresponds to the user's biometric information (e.g., face, fingerprint, or iris) stored in a memory (e.g., the memory 130 in FIG. 1). In the drawing, it is illustrated that operation 1203 is performed before operation 1205. However, operation 1203 may be simultaneously performed with operation 1205, may be performed after operation 1205, or may be performed after operation 1207. The disclosure is not limited by the drawing description.

In operation 1205, the processor 120 may analyze the face image, based on a driven light source. When one light source has been driven, the processor 120 may analyze whether a reflected ray is included in an eye in the face image. The reflected ray included in the eye may produce a specular highlight. According to an embodiment, when the distance between a camera (e.g., an image sensor) and a light source is short, the red-eye effect may occur and thus the size of the reflected ray may be large. When the distance between the camera and the light source increase, the specular highlight may appear and thus the size of a reflected ray may be small. The processor 120 may recognize a face from the acquired face image, and may detect an eye, based on the face recognition, to perform the operation of determining biometric liveness. Alternatively, the processor 120 may detect the eye from the face image to perform an operation of determining biometric liveness. Operation 1205 is identical or similar to operation 607 in FIG. 6, and thus a detailed description thereof will be omitted.

In operation 1207, the processor 120 may determine biometric liveness, based on the analysis result. The biometric liveness may be determining whether the number of reflected rays from a face image corresponds to the number of driven light sources. For example, when one light source has been driven, the processor 120 may determine whether the number of reflected rays detected from an eye in the face image is one or whether the size of a reflected ray exceeds a predetermined reference value. Alternatively, when two light sources have driven, the processor 120 may determine whether the number of reflected rays detected from an eye in the face image is two.

In operation 1209, the processor 120 may perform a function related to biometric authentication. The function related to biometric authentication has been requested in operation 601. For example, the processor 120 may unlock the electronic device 101, may perform a financial transaction service or a payment service, or may perform a configured function of an application. When biometric authentication and biometric liveness determination are successful, the processor 120 may allow a function corresponding to the biometric authentication requested in operation 601. When biometric authentication and biometric liveness determination are unsuccessful, the processor 120 may not allow a function corresponding to the biometric authentication requested in operation.

A method for operating an electronic device (e.g., the electronic device 101 in FIG. 1) according to an embodiment may include driving a camera module (e.g., the camera module 180 in FIG. 1 or the camera modules 250 and 255 in FIGS. 2A and 2B), disposed under a display (e.g., the display module 160 in FIG. 1 or the display 230 in FIGS. 2A and 2B) of the electronic device, and at least one light source (e.g., the first light source 821 to the fifth light source 829 in FIGS. 8A and 8B, or the first light source 921 to the fourth light source 927 in FIGS. 9A and 9B) disposed to correspond to the camera module, in response to a request for biometric authentication, acquiring a face image from the camera module, analyzing the face image produced at least in part by light emitted from the driven at least one light source, and performing the biometric authentication based on the analysis result.

The at least one light source may include a first light source (e.g., the fifth light source 829 in FIGS. 8A and 8B, or the third light source 925 in FIGS. 9A and 9B) disposed at a first distance from the camera module, and a second light source (e.g., the first light source 821 to the fourth light source 827 in FIGS. 8A and 8B, or the first light source 921, the second light source 923, and the fourth light source 927 in FIGS. 9A and 9B) disposed at a second distance from the camera module, and the first distance may be shorter than the second distance.

The analyzing may include determining whether a red-eye effect is detected from an eye included in the face image when the first light source is driven, or determining whether a specular highlight is detected from the eye included in the face image when the second light source is driven.

The method may include determining whether the size of a reflected ray detected from the eye is larger than a predetermined reference value when the first light source is driven, determining biometric verification to be successful when the size of the reflected ray is larger than the predetermined reference value, and determining biometric verification to be unsuccessful when the reflected ray is not detected from the eye or when the size of the reflected ray is smaller than the predetermined reference value.

The method may include determining whether the size of a reflected ray detected from an eye included in the face image appears smaller than a predetermined reference value when the second light source is driven, determining biometric verification to be successful when the size of the reflected ray is smaller than the predetermined reference value, and determining biometric verification to be unsuccessful when the reflected ray is not detected from the eye or when the size of the reflected ray is larger than the predetermined reference value.

The electronic device may further include a third light source disposed at the second distance from the camera module. The method may include acquiring a first face image by driving one of the second light source or the third light source, determining whether one reflected ray is detected from an eye included in the first face image, acquiring a second face image by driving the second light source and the third light source when one reflected ray is detected from the eye included in the first face image, determining whether two reflected rays are detected from an eye included in the second face image, determining biometric verification to be successful when two reflected rays are detected from the eye included in the second face image, and determining biometric verification to be unsuccessful when reflected rays are not detected from the eye included in the second face image or when more or less than two reflected rays are detected from the eye included in the second face image.

The at least one light source may be an IR LED.

To perform the biometric authentication, the method may further include determining whether the acquired face image matches a face image stored in the memory, and determining biometric liveness by using the light emitted from the driven at least one light source.

The method may further include performing a function related to the biometric authentication when the number of reflected rays detected from an eye included in the face image corresponds to the number of the driven at least one light source and when the acquired face image corresponds to the face image stored in the memory.

The method may further include determining, based on a security level of the r biometric authentication, the number of times biometric liveness is to be determined based on the light emitted from the driven at least one light source.

An embodiment disclosed in the specification and the drawings are merely particular examples provided for easily describing the technical matters of the disclosure and contributing to understanding the disclosure, and do not limit the scope of the disclosure. Therefore, it should be construed that all modifications or modified forms capable of being derived from the technical idea of the disclosure in addition to the embodiments disclosed herein are included in the scope of the disclosure.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RANI, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
   a display for visually providing information to a user;
   a camera module disposed under the display;
   at least one light source disposed to correspond to the camera module;
   a memory storing instruction; and
   a processor, wherein the instructions, when executed by the processor, cause the electronic device to:
   drive the camera module and the at least one light source in response to a request for biometric authentication,
   acquire a face image including an eye image from the camera module,
   determine whether the acquired face image corresponds to a face image stored including an eye image in the memory,
   determine whether a number of rays reflected by an eye identified from the eye image in the acquired face image corresponds to a number of the driven at least one light source, and
   perform a function related to the biometric authentication based on determining that the acquired face image including the eye image corresponds to the face image stored in the memory and a number of rays reflected by an eye identified from the eye image in the acquired face image corresponds to a number of the driven at least one light source.

2. The electronic device of claim 1, wherein the at least one light source further comprises:
   a first light source disposed at a first distance from the camera module; and
   a second light source disposed at a second distance from the camera module,
   wherein the first distance is shorter than the second distance.

3. The electronic device of claim 2, wherein the instructions, when executed by the processor, cause the electronic device to:
   determine whether a red-eye effect is identified from the eye image included in the acquired face image when the first light source is driven, and
   determine whether a specular highlight is identified from the eye image included in the acquired face image when the second light source is driven.

4. The electronic device of claim 3, wherein the instructions, when executed by the processor, cause the electronic device to:
   determine whether a size of a reflected ray identified from the eye image is larger than a predetermined reference value when the first light source is driven,
   determine biometric verification to be successful when the size of the reflected ray is larger than the predetermined reference value, and
   determine biometric verification to be unsuccessful when the reflected ray is absent from the eye image or when the size of the reflected ray is smaller than the predetermined reference value.

5. The electronic device of claim 3, wherein the instructions, when executed by the processor, cause the electronic device to:
   determine whether a size of a reflected ray identified from the eye image appears smaller than a predetermined reference value when the second light source is driven,
   determine biometric verification to be successful when the size of the reflected ray is smaller than the predetermined reference value, and
   determine biometric verification to be unsuccessful when the reflected ray is absent from the eye image or when the size of the reflected ray is larger than the predetermined reference value.

6. The electronic device of claim 2, further comprising a third light source disposed at the second distance from the camera module,
   wherein the instructions, when executed by the processor, cause the electronic device to:
   drive one of the second light source or the third light source to acquire a first face image,
   determine whether one reflected ray is identified from an eye image included in the first face image,
   when one reflected ray is identified from the eye image included in the first face image, drive the second light source and the third light source to acquire a second face image, determine whether two reflected rays are identified from an eye image included in the second face image, determine biometric verification to be successful when two reflected rays are identified from the eye image included in the second face image, and determine biometric verification to be unsuccessful when reflected rays are absent from the eye image included in the second face image or when more or less than two reflected rays are identified from the eye image included in the second face image.

7. The electronic device of claim 1, wherein the at least one light source is configured to be an infrared ray (IR) light-emitting diode (LED).

8. The electronic device of claim 1, wherein the instructions, when executed by the processor, cause the electronic device to determine, based on a security level of the biometric authentication, a number of times biometric liveness is to be determined based on the light emitted from the driven at least one light source.

9. A method for operating an electronic device, the method comprising:

driving a camera module, disposed under a display of the electronic device, and at least one light source, disposed to correspond to the camera module, in response to a request for biometric authentication;

acquiring a face image including an eye image from the camera module;

determining whether the acquired face image corresponds to a face image including an eye image stored in a memory of the electronic device, determining whether a number of rays reflected by an eye identified from the eye image in the acquired face image corresponds to a number of the driven at least one light source; and performing a function related to the biometric authentication based on determining that the acquired face image including the eye image corresponds to the face image stored in the memory and a number of rays reflected by an eye identified from the eye image in the acquired face image corresponds to a number of the driven at least one light source.

10. The method of claim 9, wherein the at least one light source further comprises:

a first light source disposed at a first distance from the camera module; and a second light source disposed at a second distance from the camera module, wherein the first distance is shorter than the second distance.

11. The method of claim 10, wherein the determining further comprises:

determining whether a red-eye effect is identified from the eye image included in the acquired face image when the first light source is driven; or determining whether a specular highlight is identified from the eye image included in the acquired face image when the second light source is driven.

12. The method of claim 11, further comprising:

determining whether a size of a reflected ray identified from the eye image is larger than a predetermined reference value when the first light source is driven;

determining biometric verification to be successful when the size of the reflected ray is larger than the predetermined reference value; and determining biometric verification to be unsuccessful when the reflected ray is absent from the eye image or when the size of the reflected ray is smaller than the predetermined reference value.

13. The method of claim 10, further comprising:

determining whether a size of a reflected ray identified from the eye image included in the acquired face image appears smaller than a predetermined reference value when the second light source is driven;

determining biometric verification to be successful when the size of the reflected ray is smaller than the predetermined reference value; and determining biometric verification to be unsuccessful when the reflected ray is absent from the eye image or when the size of the reflected ray is larger than the predetermined reference value.

14. The method of claim 10, wherein the electronic device further comprises a third light source disposed at the second distance from the camera module, and wherein the method further comprises:

driving one of the second light source or the third light source to acquire a first face image;

determining whether one reflected ray is identified from an eye image included in the first face image;

when one reflected ray is identified from the eye image included in the first face image, driving the second light source and the third light source to acquire a second face image;

determining whether two reflected rays are identified from an eye image included in the second face image;

determining biometric verification to be successful when two reflected rays are identified from the eye image included in the second face image; and determining biometric verification to be unsuccessful when reflected rays are absent from the eye image included in the second face image or when more or less than two reflected rays are identified from the eye image included in the second face image.

15. The method of claim 9, wherein the at least one light source is configured to be an infrared ray (IR) light-emitting diode (LED).

16. The method of claim 9, further comprising determining, based on a security level of the biometric authentication, a number of times biometric liveness is to be determined based on the light emitted from the driven at least one light source.

* * * * *